(12) United States Patent
Momose

(10) Patent No.: US 10,386,213 B2
(45) Date of Patent: Aug. 20, 2019

(54) EXCITATION CIRCUIT FOR ELECTROMAGNETIC FLOW METER, AND ELECTROMAGNETIC FLOW METER

(71) Applicant: AZBIL CORPORATION, Chiyoda-ku (JP)

(72) Inventor: Osamu Momose, Chiyoda-ku (JP)

(73) Assignee: AZBIL CORPORATION, Chiyoda-ku (JP)

( * ) Notice: Subject to any disclaimer, the term of this patent is extended or adjusted under 35 U.S.C. 154(b) by 150 days.

(21) Appl. No.: 15/806,825

(22) Filed: Nov. 8, 2017

(65) Prior Publication Data

US 2018/0128663 A1    May 10, 2018

(30) Foreign Application Priority Data

Nov. 9, 2016  (JP) ................................. 2016-218709

(51) Int. Cl.
  *G01F 1/60*      (2006.01)
  *G01F 1/58*      (2006.01)
  *H02M 7/217*     (2006.01)
  *H02M 7/5387*    (2007.01)

(52) U.S. Cl.
  CPC ................ *G01F 1/588* (2013.01); *G01F 1/60* (2013.01); *H02M 7/217* (2013.01); *H02M 7/5387* (2013.01)

(58) Field of Classification Search
  None
  See application file for complete search history.

(56) References Cited

U.S. PATENT DOCUMENTS

2006/0032316 A1*  2/2006  Ishikawa ................... G01F 1/60
                                                                      73/861.11
2018/0128665 A1*  5/2018  Momose ................. G01F 1/588

FOREIGN PATENT DOCUMENTS

JP        53-020956      2/1978
JP         5-022949      1/1993
JP       2002-188945     7/2002

* cited by examiner

*Primary Examiner* — Harshad R Patel
(74) *Attorney, Agent, or Firm* — Oblon, McClelland, Maier & Neustadt, L.L.P.

(57) ABSTRACT

An excitation circuit includes a second switch and a third switch that are respectively connected between a third signal line and a first end of an excitation coil and between the first end of the excitation coil and a fourth signal line and that are switched in accordance with intervals at which an excitation polarity is switched, a fourth switch and a fifth switch that are respectively connected between the third signal line and a second end of the excitation coil and between the second end of the excitation coil and the fourth signal line and that are switched in accordance with the intervals at which the excitation polarity is switched, a switching control circuit that controls a first switch connected between a first signal line and the third signal line at intervals shorter than the intervals at which the excitation polarity is switched.

12 Claims, 19 Drawing Sheets

EXCITATION CIRCUIT FOR ELECTROMAGNETIC FLOW METER, AND ELECTROMAGNETIC FLOW METER

CROSS-REFERENCE TO RELATED APPLICATIONS

The present application is based on and claims priority to Japanese Application No. 2016-218709, filed Nov. 9, 2016, the entire contents of which are incorporated therein by reference.

BACKGROUND

1. Field

The present disclosure relates to an electromagnetic flow meter for measuring the flow rate of fluids for various process systems, and an excitation circuit for supplying an excitation current to an excitation coil of a detector in the electromagnetic flow meter.

2. Description of the Related Art

In a typical electromagnetic flow meter for measuring the flow rate of conductive fluids, an excitation coil disposed so as to generate a magnetic field in a direction perpendicular to a direction of fluid flow within a measuring pipe is supplied with an excitation current whose polarity alternates to detect an electromotive force generated between a pair of electrodes disposed orthogonal to the magnetic field generated by the excitation coil within the measuring pipe. The electromotive force generated between the electrodes is amplified and is then subjected to sampling followed by signal processing to measure the flow rate of a fluid flowing in the measuring pipe.

In an electromagnetic flow meter, accurate measurement of the flow rate of the fluid to be detected, that is, improvement of measurement stability, is important. There have been developed a variety of techniques for improve measurement stability of electromagnetic flow meters. Now, detailed descriptions will be provided.

One method for improving measurement stability of electromagnetic flow meters is to increase the frequency of an excitation current (excitation frequency) to be supplied to an excitation coil to reduce 1/f noise included in a flow rate signal that is based on the electromotive force described above to enhance the signal-to-noise (S/N) ratio.

In an electromagnetic flow meter, typically, various noises such as electrochemical noise, fluid noise, and slurry noise are superimposed on an electromotive force detected by electrodes. Such noises need to be reduced for accurate calculation of the value for the flow rate from the electromotive force. These noises have a characteristic of having a higher level in a lower frequency band, called a 1/f characteristic. Hence, as the excitation frequency increases, the S/N ratio for the electromotive force becomes better, which results in high-accuracy calculation of the value for the flow rate.

When such a rectangular-wave alternating-current (AC) excitation current is applied to an excitation coil, the self-inductance of the excitation coil leads to a moderate rise of the excitation current, which causes a delay in the waveform of the excitation current. Thus, as the excitation frequency increases, the wavelength of the excitation signal becomes short and the amount of delay of the rising edge relative to the wavelength increases, which results in a shortened period over which a sufficient magnetic field is generated. As a result, the width of a steady-state area within which the electromotive force detected by the electrodes has a flat amplitude is also reduced accordingly. It is thus difficult to stably sample the electromotive force, which leads to increased error in the value for the flow rate. It is therefore desirable that the excitation current rapidly rise even at high excitation frequencies.

For example, Japanese Unexamined Patent Application Publication No. 53-20956 (hereinafter referred to as "Patent Literature 1") discloses a technique for an excitation circuit for supplying an excitation current to an excitation coil. In the disclosed technique, to make the excitation current rise rapidly when the polarity of the excitation current (hereinafter referred to as the "excitation polarity") is switched at an increased excitation frequency, two power supplies having a high voltage and a low voltage are prepared in advance such that the excitation coil is excited by the high voltage at the rise time of the excitation current and is excited by the low voltage during the steady state.

Another method for improving measurement stability of electromagnetic flow meters is to increase the excitation current to increase the signal level of the flow rate signal described above.

However, in an electromagnetic flow meter of the related art (see, for example, Patent Literature 1), an excitation current is generated by a constant current circuit configured such that a power transistor is controlled by an operational amplifier with negative feedback. Thus, as the excitation current increases, the heat generation of the power transistor also increases, which requires a large radiator. It is therefore desirable to increase the excitation current with reduced heat generation.

For example, Japanese Unexamined Patent Application Publication No. 5-22949 (hereinafter referred to as "Patent Literature 2") and Japanese Unexamined Patent Application Publication No. 2002-188945 (hereinafter referred to as "Patent Literature 3") disclose techniques in which an excitation voltage that is made variable with a switching DC-DC converter is controlled in accordance with the residual voltage of a power transistor to reduce the heat generation of the power transistor. In excitation circuits disclosed in these patent literatures, a switching DC-DC converter performs constant current control of an excitation current, which eliminates the need for the constant current circuit disclosed in Patent Literature 1.

The excitation circuit disclosed in Patent Literature 2 enables an increase in excitation current with reduced heat generation. In the excitation circuit disclosed in Patent Literature 2, however, a direct current (DC) excitation voltage is generated by a DC conversion circuit including an inductor and a stabilization capacitor (output capacitor)m and thus a delay in response causes a delay in constant current control. Delayed constant current control prolongs a stabilization period taken until the excitation current becomes stable after the excitation polarity is switched, which makes it difficult to increase the excitation frequency. A reduction in the stabilization period may make the constant current control unstable.

In contrast, the excitation circuit disclosed in Patent Literature 3 is configured to directly pulse-drive the excitation coil without using the DC conversion circuit in the excitation circuit disclosed in Patent Literature 2, which can make the stabilization period for constant current control shorter than that in the excitation circuit disclosed in Patent Literature 2. As a result, the excitation frequency can be made higher.

In recent years, electromagnetic flow meters for the factory automation (FA) market have been receiving attention. Such electromagnetic flow meters are incorporated in FA devices for use and are thus required to be small in size.

Electromagnetic flow meters are typically classified roughly into two types: contact type and capacitive (non-contact) type. In the contact type, electrodes attached to a measuring pipe are brought into direct contact with the fluid to be measured to detect the electromotive force in the fluid. In the capacitive (non-contact) type, electrodes attached to a measuring pipe are not brought into contact with the fluid to be measured and the electromotive force in the fluid is detected using capacitance between the fluid and the electrodes. In particular, small capacitive-type electromagnetic flow meters having electrodes resistant to deterioration and designed for easy maintenance have been receiving attention recently.

In the related art, however, because of its design constraints, a small electromagnetic flow meter inevitably deteriorates measurement stability.

Specifically, when the excitation circuit disclosed in Patent Literature 1 described above is employed, to improve measurement stability, a higher excitation voltage is required for switching the excitation polarity to make the excitation current rise rapidly. An increase in excitation voltage leads to an increase in the power consumption of the power transistor in the constant current circuit and an increase in heat generation, which requires a radiator. However, it is difficult to keep space for the radiator to achieve a reduction in the size of an electromagnetic flow meter. To eliminate the need for a radiator, the excitation voltage and the excitation current need to be kept low and hence sufficient measurement stability is not expectable.

When the excitation circuit disclosed in Patent Literature 2 described above is employed, it is probable to increase the excitation voltage without using a radiator. However, as described above, it is difficult to increase the excitation frequency and hence sufficient measurement stability is not expectable.

When the excitation circuit disclosed in Patent Literature 3 described above is employed, which has a circuit configuration in which a resistor for detecting the excitation current is inserted in series with the excitation coil, separate power supplies that are isolated from each other are required to detect the current. In the excitation circuit, furthermore, since two high-side switches (transistors Q1 and Q2 in this patent literature) connected to an excitation coil have both a function of switching the polarity of the excitation current and a pulse driving function for generating an excitation voltage, it is necessary to perform a high-speed switching operation (e.g., several hundreds of kilohertz (kHz) to several megahertz (MHz)), which results in an increase in the complexity of a drive circuit for driving the high-side switches.

When the excitation circuit disclosed in Patent Literature 3 is employed, therefore, even if the excitation voltage and the excitation frequency are successfully increased without using a radiator, the complexity of the excitation circuit is increased. As a result, it is difficult to reduce the size of the electromagnetic flow meter.

In the related art, therefore, it is difficult to achieve both measurement stability and size reduction of an electromagnetic flow meter.

SUMMARY

Accordingly, an embodiment of the present disclosure provides a small electromagnetic flow meter having high measurement stability.

An excitation circuit (15, 15A to 15E) according to an aspect of the present disclosure is an excitation circuit for supplying an excitation current (Iex) to an excitation coil (Lex) in an electromagnetic flow meter (10). The excitation circuit includes a first signal line (VexH) supplied with a first direct-current voltage (VexH), a second signal line (Vex-COM) supplied with a second direct-current voltage (Vex-COM) lower than the first direct-current voltage, a third signal line (VOUT), a fourth signal line (VFB), a first switch (S1) connected between the first signal line and the third signal line, a second switch (S11) connected between the third signal line and a first end (n01) of the excitation coil, the second switch being switched in accordance with intervals at which an excitation polarity of the excitation coil is switched, a third switch (S12) connected between the first end of the excitation coil and the fourth signal line, the third switch being switched in accordance with the intervals at which the excitation polarity of the excitation coil is switched, a fourth switch (S13) connected between the third signal line and a second end (n02) of the excitation coil, the fourth switch being switched in accordance with the intervals at which the excitation polarity of the excitation coil is switched, a fifth switch (S14) connected between the second end of the excitation coil and the fourth signal line, the fifth switch being switched in accordance with the intervals at which the excitation polarity of the excitation coil is switched, a current-detecting resistor connected (Rs) connected between the fourth signal line and the second signal line, a switching control circuit (150, 150A) that switches between on and off states of the first switch at intervals shorter than the intervals at which the excitation polarity of the excitation coil is switched, such that current (Is) flowing through the current-detecting resistor is constant, and at least one current-returning element (D1) that allows current in the excitation coil to return via the current-detecting resistor when the first switch is turned off.

The excitation circuit ma further include a first backflow prevention element (D11) connected in series with the second switch between the third signal line and the first end of the excitation coil, the first backflow prevention element being configured to allow current flow from the third signal line to the first end of the excitation coil and configured to block current flow in a direction opposite to the current flow from the third signal line to the first end of the excitation coil, a second backflow prevention element (D12) connected in series with the third switch between the first end of the excitation coil and the fourth signal line, the second backflow prevention element being configured to allow current flow from the first end of the excitation coil to the fourth signal line and configured to block current flow in a direction opposite to the current flow from the first end of the excitation coil to the fourth signal line, a third backflow prevention element (D13) connected in series with the fourth switch between the third signal line and the second end of the excitation coil, the third backflow prevention element being configured to allow current flow from the third signal line to the second end of the excitation coil and configured to block current flow in a direction opposite to the current flow from the third signal line to the second end of the excitation coil, and a fourth backflow prevention element (D14) connected in series with the fifth switch between the second end of the excitation coil and the fourth signal line, the fourth backflow prevention element being configured to allow current flow from the second end of the excitation coil to the fourth signal line and configured to block current flow in a direction opposite to the current flow from the second end of the excitation coil to the fourth signal line.

In the excitation circuit, the first backflow prevention element may include a first metal-oxide-semiconductor (MOS) transistor (MP2) having a source connected to the first end of the excitation coil and a drain connected to the third signal line, the second backflow prevention element may include a second MOS transistor (MN1) having a source connected to the second signal line and a drain connected to the first end of the excitation coil, the third backflow prevention element may include a third MOS transistor (MP2) having a source connected to the second end of the excitation coil and a drain connected to the third signal line, and the fourth backflow prevention element may include a fourth MOS transistor (MN1) having a source connected to the second signal line and a drain connected to the second end of the excitation coil.

In the excitation circuit, the current-returning element may include a rectifier element (D1) connected between the second signal line and the third signal line, the rectifier element being configured to allow current flow from the second signal line to the third signal line and configured to block current flow in a direction opposite to the current flow from the second signal line to the third signal line.

In the excitation circuit, the current-returning element may be a synchronous rectifier switch connected between the second signal line and the third signal line, and the switching control circuit may turn off the synchronous rectifier switch when the first switch is turned on, and turn on the synchronous rectifier switch when the first switch is turned off.

In the excitation circuit, the current-returning element may include a first rectifier element (D1a) connected between the first end of the excitation coil and the second signal line, the first rectifier element being configured to allow current flow from the second signal line to the first end of the excitation coil and configured to block current flow in a direction opposite to the current flow from the second signal line to the first end of the excitation coil, and a second rectifier element (D1b) connected between the second end of the excitation coil and the second signal line, the second rectifier element being configured to allow current flow from the second signal line to the second end of the excitation coil and configured to block current flow in a direction opposite to the current flow from the second signal line to the second end of the excitation coil.

The excitation circuit may further include a third rectifier element (D2) connected between the first signal line and the first switch, the third rectifier element being configured to allow current flow from the first signal line to the first switch and configured to block current flow in a direction opposite to the current flow from the first signal line to the first switch, a fifth signal line (VIN) to which the third rectifier element and the first switch are connected, a capacitor (C1) connected between the fifth signal line and the second signal line, a fourth rectifier element (D3) connected between the fifth signal line and the first end of the excitation coil, the fourth rectifier element being configured to allow current flow from the first end of the excitation coil to the fifth signal line and configured to block current flow in a direction opposite to the current flow from the first end of the excitation coil to the fifth signal line, and a fifth rectifier element (D4) connected between the fifth signal line and the second end of the excitation coil, the fifth rectifier element being configured to allow current flow from the second end of the excitation coil to the fifth signal line and configured to block current flow in a direction opposite to the current flow from the second end of the excitation coil to the fifth signal line.

In the excitation circuit, the switching control circuit may output a pulse-width-modulation (PWM) signal having a variable pulse width that is variable in accordance with a difference between a current flowing through the current-detecting resistor and a target current value, and perform switching of the first switch.

In the excitation circuit, the switching control circuit may output a pulse-frequency-modulation (PFM) signal having a frequency that is variable in accordance with a difference between a current flowing through the current-detecting resistor and a target current value, and perform switching of the first switch.

In the excitation circuit, the switching control circuit may be a single semiconductor integrated circuit.

An electromagnetic flow meter according to another aspect of the present disclosure includes a measuring pipe (Pex) in which a fluid to be measured flows, an excitation coil (Lex) external to the measuring pipe, the excitation circuit (15, 15A to 15E), a pair of electrodes (E1, E2) attached to the measuring pipe and facing each other in a direction perpendicular to a magnetic field generated from the excitation coil, and a data processing control circuit (14) that calculates a flow rate of the fluid based on an electromotive force generated between the pair of electrodes.

In the electromagnetic flow meter, the pair of electrodes may be disposed in non-contact with the fluid in the measuring pipe.

According to an aspect of the present disclosure, a small electromagnetic flow meter having high measurement stability may be provided.

DETAILED DESCRIPTION

Figure 1:
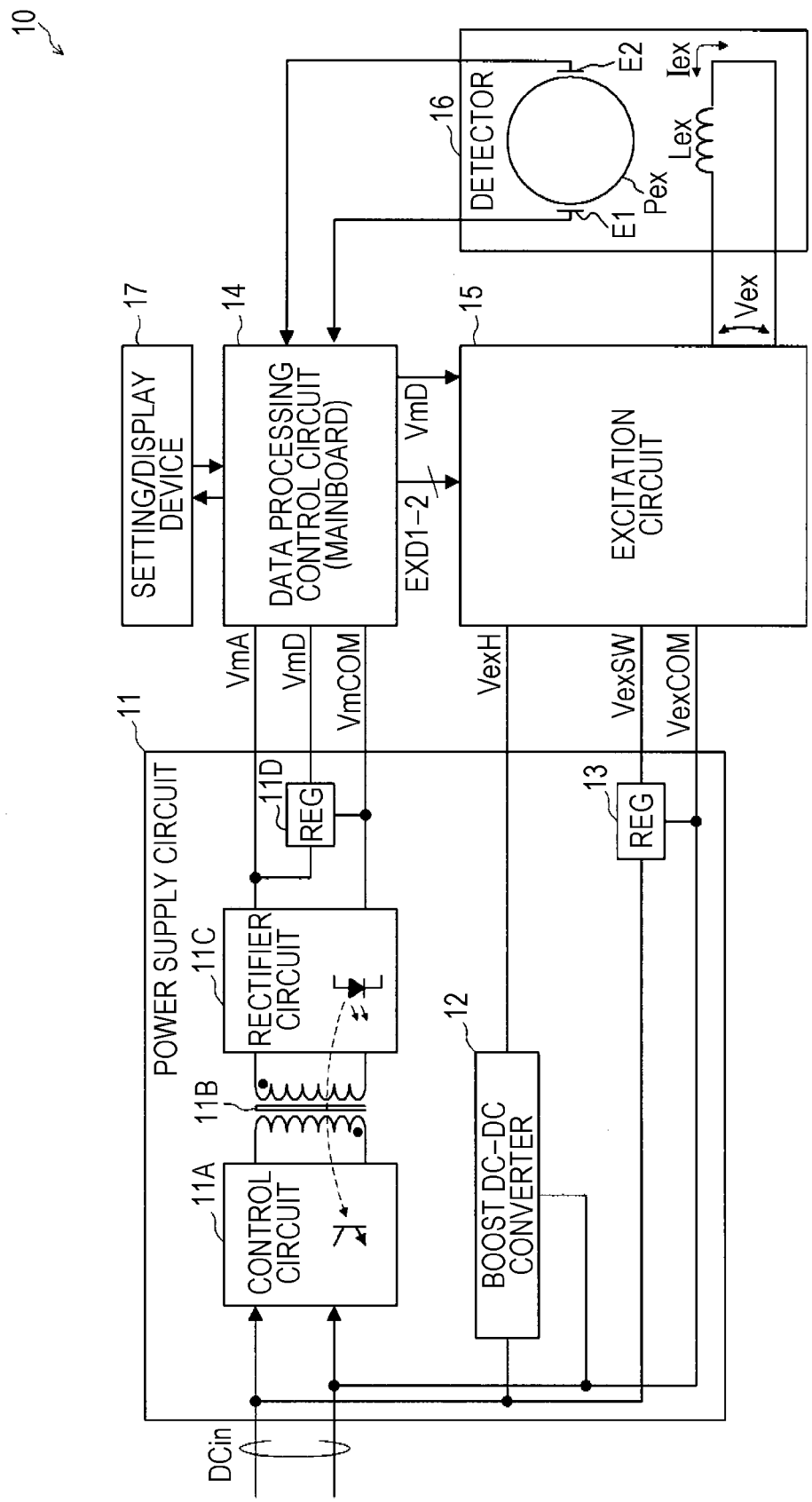
FIG. 1 illustrates the configuration of an electromagnetic flow meter including an excitation circuit according to an embodiment of the present disclosure.

Embodiments of the present disclosure will be described hereinafter with reference to the drawings. In the following description, elements common to the embodiments are identified with the same reference numerals and are not repeatedly described.

First Embodiment

Configuration of Electromagnetic Flow Meter

FIG. 1 illustrates the configuration of an electromagnetic flow meter including an excitation circuit according to an embodiment of the present disclosure.

An electromagnetic flow meter 10 illustrated in FIG. 1 has a function of measuring the flow rate of conductive fluids. An excitation coil Lex disposed so as to generate a magnetic field in a direction perpendicular to a direction of fluid flow within a measuring pipe Pex of a detector 16 is supplied with an excitation current Iex whose polarity alternates to detect an electromotive force generated between a pair of electrodes E1 and E2. The electrodes E1 and E2 are attached to the measuring pipe Pex and are disposed orthogonal to the magnetic field generated by the excitation coil Lex. The electromotive force is amplified and is then subjected to sampling followed by signal processing to measure the flow rate of a fluid flowing in the measuring pipe Pex.

Specifically, the electromagnetic flow meter 10 mainly includes circuit units, namely, a power supply circuit 11, a data processing control circuit 14, an excitation circuit 15, the detector 16, and a setting/display device 17.

The power supply circuit 11 has a function of generating a plurality of DC voltages from an input DC power supply DCin (e.g., 24 V) from a high order device (not illustrated) and supplying the DC voltages to the data processing control circuit 14 and the excitation circuit 15. Specifically, the power supply circuit 11 is mainly constituted by circuit units, namely, a control circuit 11A, a switching transformer 11B, a rectifier circuit 11C, a voltage regulator (REG) 11D, a boost DC-DC converter 12, and a voltage regulator (REG) 13.

The control circuit 11A performs switching of the input DC power supply DCin at a frequency as high as about several tens of kilohertz (kHz) to several megahertz (MHz), for example, and supplies the input DC power supply DCin to the primary winding of the switching transformer 11B. The rectifier circuit 11C rectifies a high-frequency pulse signal output from the secondary winding of the switching transformer 11B to generate a DC operating voltage VmA (e.g., 24 V) for analog signal processing and a ground potential VmCOM (0 V) and supplies the operating voltage VmA and the ground potential VmCOM to the data processing control circuit 14. The voltage regulator 11D generates an operating voltage VmD (e.g., 5V) for digital signal processing from the operating voltage VmA and supplies the operating voltage VmD to the data processing control circuit 14.

The boost DC-DC converter 12 is formed of a non-isolated boost choke converter circuit. The boost DC-DC converter 12 has a function of generating an excitation DC voltage VexH (e.g., 80 V–24 V) and supplying the excitation DC voltage VexH to the excitation circuit 15. The excitation DC voltage VexH is generated by, for example, performing high-frequency switching of the input DC power supply DCin using pulse width modulation (PWM) on the basis of a clock signal CLK having a frequency as high as about several hundreds of kilohertz (kHz) and having a PWM period Tpwm to obtain a high-frequency signal and charging a capacitance element with a current flowing from the input DC power supply DCin to a choke coil via a diode using the obtained high-frequency signal. The boost DC-DC converter 12 also has a function of performing voltage feedback control and current feedback control when performing switching.

The voltage regulator 13 has a function of generating a common drive voltage VexSW (e.g., 10 V) for driving switches S11 to S14 in the excitation circuit 15 described below from the input DC power supply DCin and supplying the common drive voltage VexSW to the excitation circuit 15.

Further, a voltage of the negative pole of the input DC power supply DCin is supplied to the excitation circuit 15 as a common voltage VexCOM (<VexH, for example, 0 V).

In the following description, signs used to identify voltages, such as "VexSW", "VexH", "VexCOM", and "VmD", are also used to identify, in addition to the voltages, signal lines supplied with the corresponding voltages.

The data processing control circuit 14 includes a program processing device (e.g., a central processing unit (CPU)), a signal processing circuit, a transmission interface (I/F) circuit, and so on, and has a function of controlling the excitation circuit 15, calculating a flow rate based on an electromotive force detected from the electrodes E1 and E2 of the detector 16, and outputting a flow rate signal to the high order device.

The detector 16 includes the measuring pipe Pex in which a fluid whose flow rate is to be measured flows, the excitation coil Lex, which generates a magnetic field relative to the measuring pipe Pex by using an excitation current supplied from the excitation circuit 15, and the pair of detection electrodes E1 and E2. The detection electrodes E1 and E2 are disposed on the outer circumferential surface of the measuring pipe Pex.

The setting/display device 17 has a function of detecting a setting operation input of an operator and outputting the setting operation input to the data processing control circuit 14, and a function of displaying a display output from the data processing control circuit 14 by using a light-emitting diode (LED) or a liquid crystal display (LCD).

The excitation circuit 15 has a function of supplying the excitation current Iex whose excitation polarity is switched at constant intervals to the excitation coil Lex of the detector 16 under control of the data processing control circuit 14. The excitation circuit 15 will be described in detail hereinafter.

Configuration of Excitation Circuit According to One Embodiment

Figure 2A:
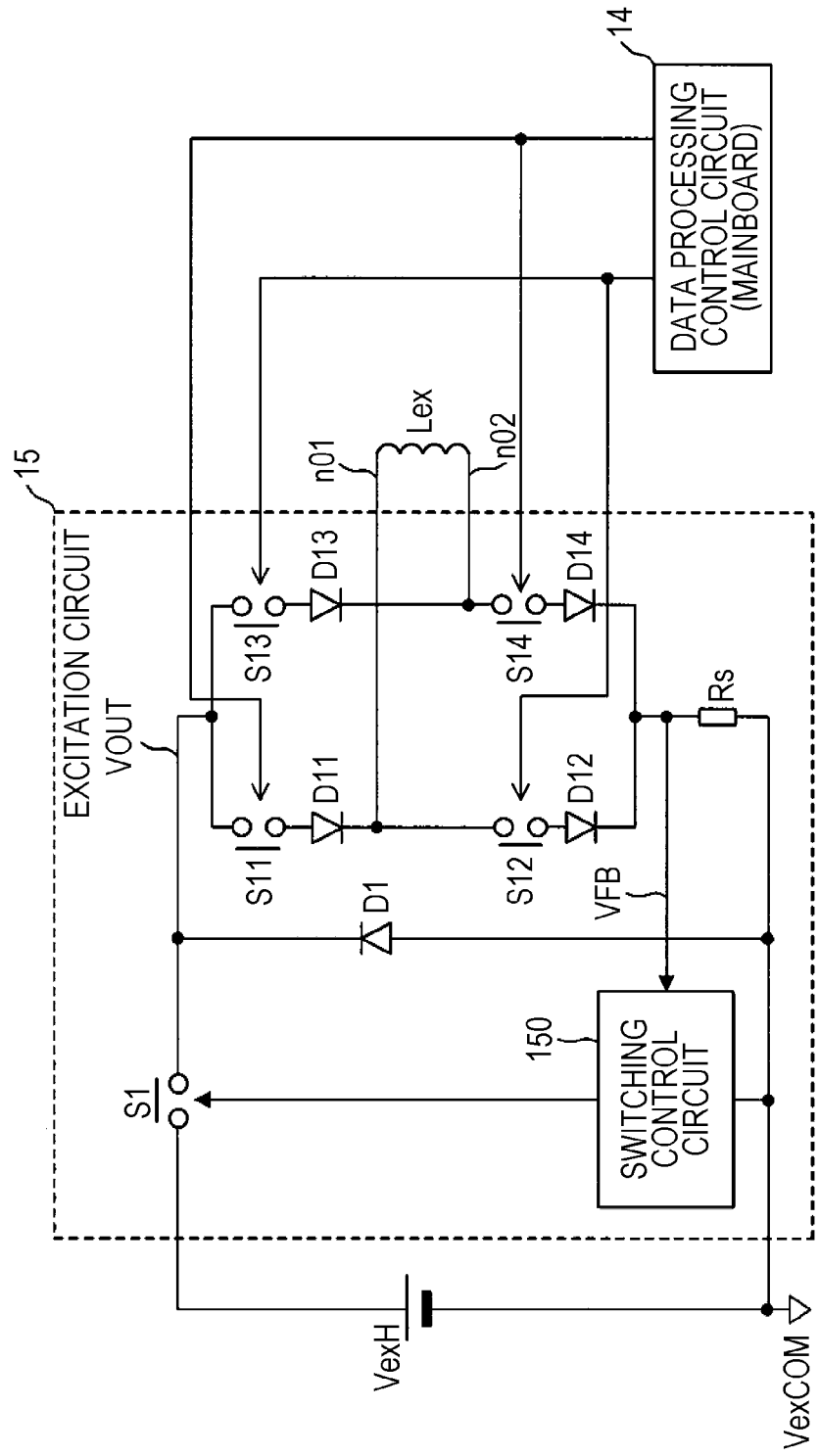
FIG. 2A conceptually illustrates the configuration of an excitation circuit according to an embodiment of the present disclosure.

FIG. 2A conceptually illustrates the configuration of an excitation circuit according to an embodiment of the present disclosure.

The excitation circuit 15 has a feature in that a switch for switching the excitation polarity of the excitation coil Lex and a switch for directly pulse-driving the excitation coil Lex to perform constant current control of an excitation current are controlled by separate control mechanisms.

Specifically, as illustrated in FIG. 2A, the excitation circuit 15 includes a switch S1 for directly pulse-driving the excitation coil Lex to control the excitation current Iex to be constant, the switches S11 to S14 for switching the excitation polarity of the excitation coil Lex, a current-detecting resistor Rs for detecting the excitation current Iex, a diode D1 serving as at least one current-returning element that allows the excitation current Iex to return via the current-detecting resistor Rs when the switch S1 is turned off, and a switching control circuit 150 for switching between the on and off states of the switch S1 at intervals shorter than the switching intervals of the switches S11 to S14 such that the current flowing through the current-detecting resistor Rs is kept constant.

The switch S1 is connected between a signal line VexH supplied with the excitation DC voltage VexH, which serves as a first direct-current voltage, and a signal line VOUT supplied with an excitation voltage VOUT of the excitation coil Lex. The switch S1 is constituted by, for example, a power transistor.

The switch S11 is connected between the signal line VOUT and a first end (node n01) of the excitation coil Lex, and the on and off states of the switch S11 are switched between at constant intervals. The switch S12 is connected between a signal line VFB and the first end of the excitation coil Lex. The switch S12 is turned off when the switch S11 is turned on, and is turned on when the switch S11 is turned off. The switch S13 is connected between the signal line VOUT and a second end (node n02) of the excitation coil Lex. The switch S13 is turned off when the switch S11 is turned on, and is turned on when the switch S11 is turned off. The switch S14 is connected between the second end of the excitation coil Lex and the signal line VFB. The switch S14 is turned on when the switch S11 is turned on, and is turned off when the switch S11 is turned off.

As described above, the on and off states of the switch S1 are switched between at intervals shorter than the switching intervals of the switches S11 to S14, that is, shorter than the intervals at which the excitation polarity is switched. For example, the switching frequencies of the switches S11 to S14 are less than or equal to 1 kHz, and the switching frequency of the switch S1 is at least 10 kHz. The switch S1 is herein sometimes referred to as the "high-speed switch S1", and the switches S11 to S14 are herein sometimes referred to as the "low-speed switches S11 to S14", respectively.

The current-detecting resistor Rs is connected between a signal line VexCOM supplied with the common voltage VexCOM and the signal line VFB.

The diode D1, which serves as a rectifier element, has an anode connected to the signal line VexCOM and a cathode connected to the signal line VOUT.

The switching control circuit 150 operates using the common voltage VexCOM as a reference power supply, generates a PWM signal whose pulse width is variable in accordance with a difference between the excitation current Iex flowing through the current-detecting resistor Rs and a target current value, and performs switching of the high-speed switch S1 in accordance with the PWM signal.

Specifically, the switching control circuit 150 receives as an input the detection voltage (feedback voltage) VFB of the current-detecting resistor Rs relative to the common voltage VexCOM, and generates a PWM signal whose pulse width is variable such that the detection voltage VFB matches a reference voltage Vref corresponding to the target current value.

The excitation circuit 15 further includes diodes D11 to D14 serving as backflow prevention elements for preventing the excitation current Iex from flowing in paths other than a path that passes through the current-detecting resistor Rs when the high-speed switch S1 is turned off.

The diode D11 is connected in series with the low-speed switch S11 between the signal line VOUT and the first end (node n01) of the excitation coil Lex. The diode D11 allows the flow of current from the signal line VOUT to the first end of the excitation coil Lex and blocks the flow of current in the reverse direction.

The diode D12 is connected in series with the low-speed switch S12 between the first end (node n01) of the excitation coil Lex and the signal line VFB. The diode D12 allows the flow of current from the first end of the excitation coil Lex to the signal line VFB and blocks the flow of current in the reverse direction.

The diode D13 is connected in series with the low-speed switch S13 between the signal line VOUT and the second end of the excitation coil Lex. The diode D13 allows the flow of current from the signal line VOUT to the second end of the excitation coil Lex and blocks the flow of current in the reverse direction.

The diode D14 is connected in series with the low-speed switch S14 between the second end of the excitation coil Lex and the signal line VFB. The diode D14 allows the flow of current from the second end of the excitation coil Lex to the signal line VFB and blocks the flow of current in the reverse direction.

Configuration of Excitation Circuit According to a First Embodiment

Figure 2B:
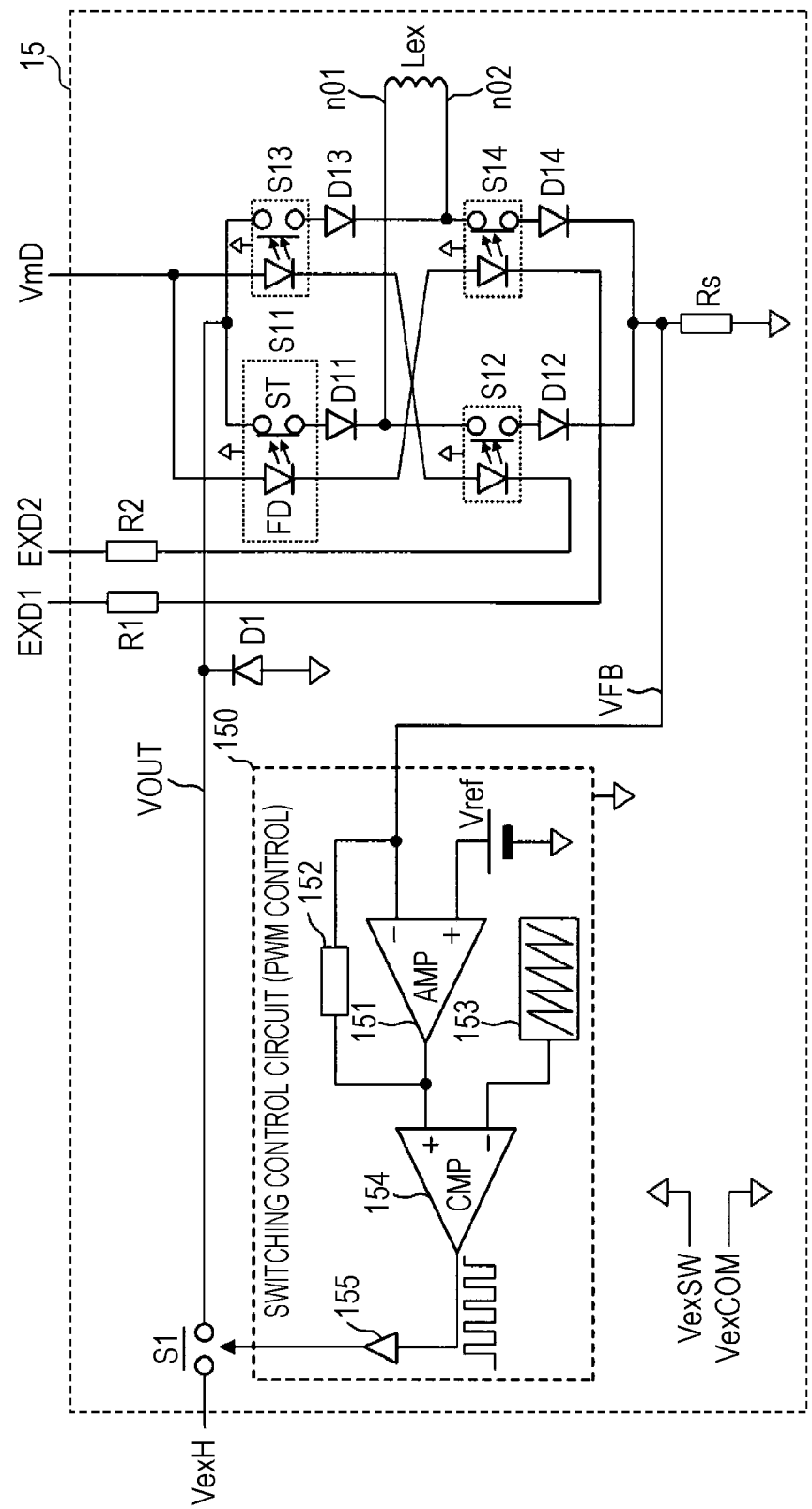
FIG. 2B illustrates the configuration of an excitation circuit according to a first embodiment.

An embodiment of the excitation circuit 15 illustrated in FIG. 2A is illustrated in FIG. 2B.

FIG. 2B illustrates the configuration of an excitation circuit according to a first embodiment.

As illustrated in FIG. 2B, the low-speed switches S11 to S14 are configured such that on/off switching control of the low-speed switches S11 to S14 is performed in accordance with excitation polarity signals EXD1 and EXD2 from the data processing control circuit 14 (e.g., a CPU).

Specifically, in a period during which the excitation polarity of the excitation coil Lex is kept "positive", the data processing control circuit 14 (e.g., a CPU) turns on the low-speed switches S11 and S14 and turns off the low-speed switches S12 and S13. In a period during which the excitation polarity of the excitation coil Lex is kept "negative", the data processing control circuit 14 turns off the low-speed switches S11 and S14 and turns on the low-speed switches S12 and S13.

In the low-speed switches S11 to S14, the primary side to which the excitation polarity signals EXD1 and EXD2 are input and the secondary side through which the excitation current Iex flows are electrically isolated from each other. For example, the low-speed switches S11 to S14 are each constituted by a circuit including a photocoupler, and the on and off states of a switch (transistor) ST on the secondary side of the photocoupler are switched between in accordance with the intensity of light applied from a photodiode FD on the primary side of the photocoupler.

For example, the data processing control circuit 14 switches the logic (e.g., VmD for the high level and VmCOM for the low level) of the excitation polarity signals EXD1 and EXD2 with the operating voltage VmD for digital signal processing being applied to the anodes of the photodiodes FD on the primary side of the low-speed switches S11 and S13 to control the current flowing through the photodiodes FD on the primary side of the photocouplers, thereby switching between the on and off states of the switches ST on the secondary side of the photocouplers.

As described above, the switching control circuit 150 is a circuit for switching the high-speed switch S1 in accordance with the detection voltage VFB by using the PWM technique. The switching control circuit 150 may be a known general-purpose DC-DC converter control integrated circuit (IC).

The general-purpose DC-DC converter control IC may be, as illustrated in FIG. 2B, an IC configured such that only the switching control circuit 150, which controls an external power transistor serving as the high-speed switch S1 is sealed into a single package or an IC configured such that a power transistor serving as the high-speed switch S1 and a switching control circuit are sealed into a single package, regardless of whether the power transistor to be driven and the switching control circuit 150 are packaged as a single IC.

The switching control circuit 150 can be exemplified by, as illustrated in FIG. 2B, a circuit constituted by an error amplifier circuit (error amplifier) (AMP) 151, a phase compensator 152, a periodic signal generation circuit 153 that generates a periodic signal such as a saw-tooth wave or triangular wave signal, a comparator 154, and a drive circuit 155.

The error amplifier 151 generates an error signal corresponding to an error between the detection voltage VFB of the current-detecting resistor Rs and the reference voltage Vref, which corresponds to a target current value of the excitation current Iex. The comparator 154 compares the error signal with a periodic signal output from the periodic signal generation circuit 153 and generates a binary signal (PWM signal) corresponding to the comparison result. The PWM signal generated by the comparator 154 is buffered by the drive circuit 155 to drive the high-speed switch S1, which is constituted by a power transistor.

Operation of Excitation Circuit According to a First Embodiment

Next, the operation of the excitation circuit 15 according to the first embodiment will be described in detail.

First, the data processing control circuit 14 (e.g., a CPU) switches the logic (e.g., VmD for the high level and VmCOM for the low level) of the excitation polarity signals EXD1 and EXD2 with the operating voltage VmD for digital signal processing being applied to the anodes of the photodiodes FD on the primary side of the low-speed switches S11 and S13 to control the current flowing through the photodiodes FD on the primary side of the low-speed switches S11 to S14, thereby switching each of the low-speed switches S11 to S14 at constant intervals (step ST1). As described above, the switching frequencies of the low-speed switches S11 to S14 are less than or equal to 1 kHz.

In contrast, the switching control circuit 150 switches the high-speed switch S1 at intervals shorter than the switching intervals of the low-speed switches S11 to S14 to generate a pulsed voltage VOUT from the excitation DC voltage VexH, and outputs the voltage VOUT to the signal line VOUT (step ST2). As described above, the switching frequency of the high-speed switch S1 is greater than or equal to 10 kHz.

Through the switching operation of the high-speed switch S1 and the low-speed switches S11 to S14 in steps ST1 and ST2, a pulse voltage Vex having a positive or negative polarity is applied to the excitation coil Lex in accordance with the states of the low-speed switches S11 to S14. Thus, the excitation current Iex having a positive or negative polarity flows through the excitation coil Lex (step ST3). The path in which the excitation current Iex flows will be described in detail below.

The excitation current Iex, which flows into the signal line VexCOM via the current-detecting resistor Rs, is converted into the detection voltage VFB by the current-detecting resistor Rs and is input to an inverting input terminal (minus (−) terminal) of the error amplifier circuit 151 of the switching control circuit 150 (step ST4).

The error amplifier circuit 151 generates an error signal whose voltage changes in accordance with the difference between the detection voltage VFB and the reference voltage Vref (step ST5).

The comparator 154 of the switching control circuit 150 compares the error signal generated by the error amplifier circuit 151 with the periodic signal (e.g., a saw-tooth wave signal) generated by the periodic signal generation circuit 153 and generates a binary signal corresponding to the comparison result (step ST6).

Thus, a PWM signal whose pulse width is controlled such that the on-time of the high-speed switch S1 is long when the excitation current Iex is lower than the target current value and the on-time of the high-speed switch S1 is short when the excitation current Iex is higher than the target current value is generated, and the high-speed switch S1 is controlled (step ST7).

Through the feedback control in steps ST2 to ST7 described above, the excitation current Iex is controlled to be a constant value.

Next, flow paths of the excitation current Iex in response to the switching operation of the high-speed switch S1 and the low-speed switches S11 to S14 will be described in detail.

FIGS. 3A to 3D illustrate flow paths of an excitation current in an excitation circuit according to the first embodiment. In FIGS. 3A to 3D, only a circuit configuration that is part of the excitation circuit 15 is illustrated.

First, the description will be given of flow paths of current whose excitation polarity is "positive".

Figure 3A:
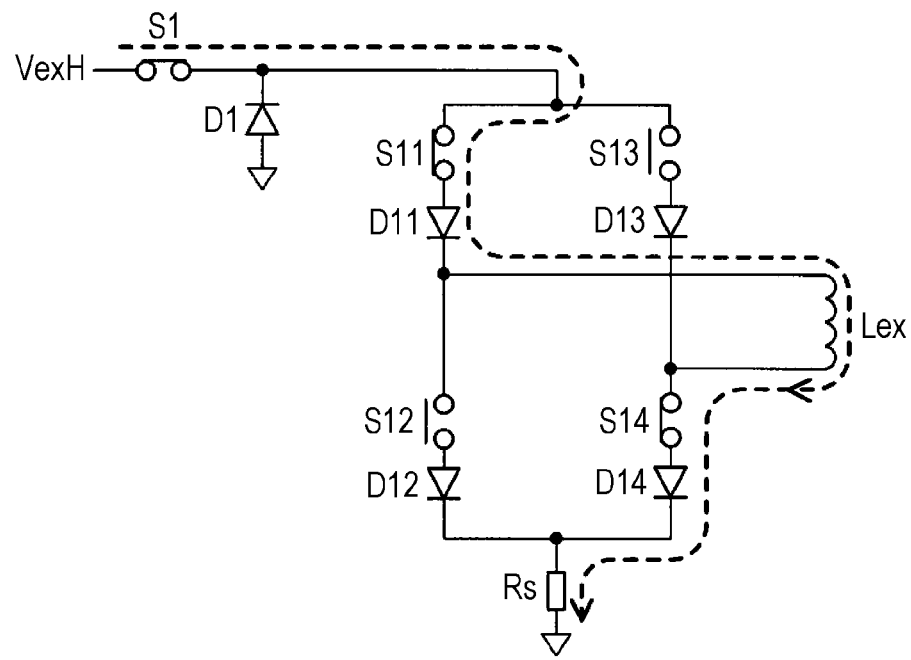
FIG. 3A illustrates a flow path of an excitation current having a positive polarity when a high-speed switch is in an on state in the excitation circuit according to the first embodiment.

When the excitation polarity is "positive", the low-speed switches S11 and S14 are turned on and the low-speed switches S12 and S13 are turned off. In this state, when the high-speed switch S1 is turned on, as illustrated in FIG. 3A, the excitation current Iex flows into the signal line VexCOM from the signal line VexH via the high-speed switch S1, the low-speed switch S11, the diode D11, the excitation coil Lex, the low-speed switch S14, the diode D14, and the current-detecting resistor Rs, and the excitation coil Lex is excited to the positive polarity. In this case, energy is stored in the excitation coil Lex.

Figure 3B:
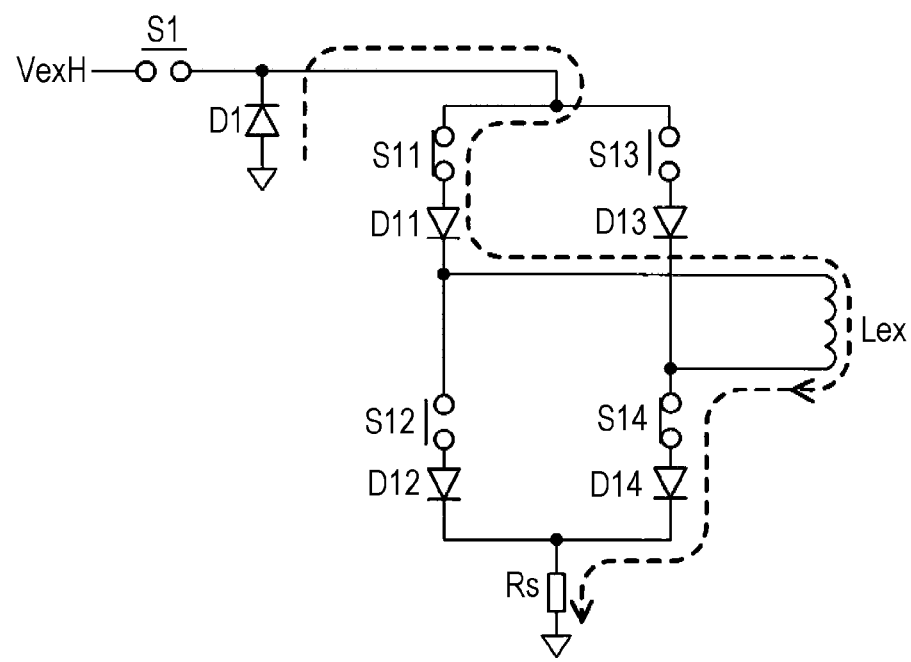
FIG. 3B illustrates a flow path of an excitation current having a positive polarity when high-speed switch is in an off state in the excitation circuit according to the first embodiment.

As illustrated in FIG. 3B, when the high-speed switch S1 is turned off, in contrast, the energy stored in the excitation coil Lex when the high-speed switch S1 is in the on state allows current to flow into the signal line VexCOM from the signal line VexCOM via the diode D1, the low-speed switch S11, the diode D11, the excitation coil Lex, the low-speed switch S14, the diode D14, and the current-detecting resistor Rs. Accordingly, the excitation current Iex having a positive polarity is held even in the period during which the high-speed switch S1 is in the off state.

Next, the description will be given of flow paths of current whose excitation polarity is "negative".

Figure 3C:
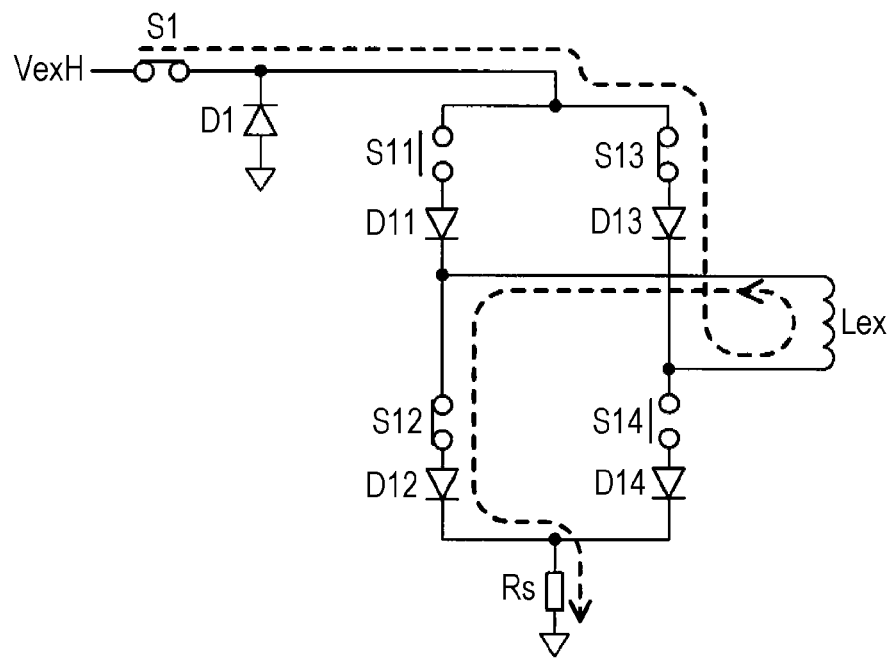
FIG. 3C illustrates a flow path of an excitation current having a negative polarity when high-speed switch is in an on state in the excitation circuit according to the first embodiment.

When the excitation polarity is "negative", the low-speed switches S11 and S14 are turned off and the low-speed switches S12 and S13 are turned on. In this state, when the high-speed switch S1 is turned on, as illustrated in FIG. 3C, the excitation current Iex flows into the signal line VexCOM from the signal line VexH via the high-speed switch S1, the low-speed switch S13, the diode D13, the excitation coil Lex, the low-speed switch S12, the diode D12, and the current-detecting resistor Rs, and the excitation coil Lex is excited to the negative polarity. In this case, energy is stored in the excitation coil Lex.

Figure 3D:
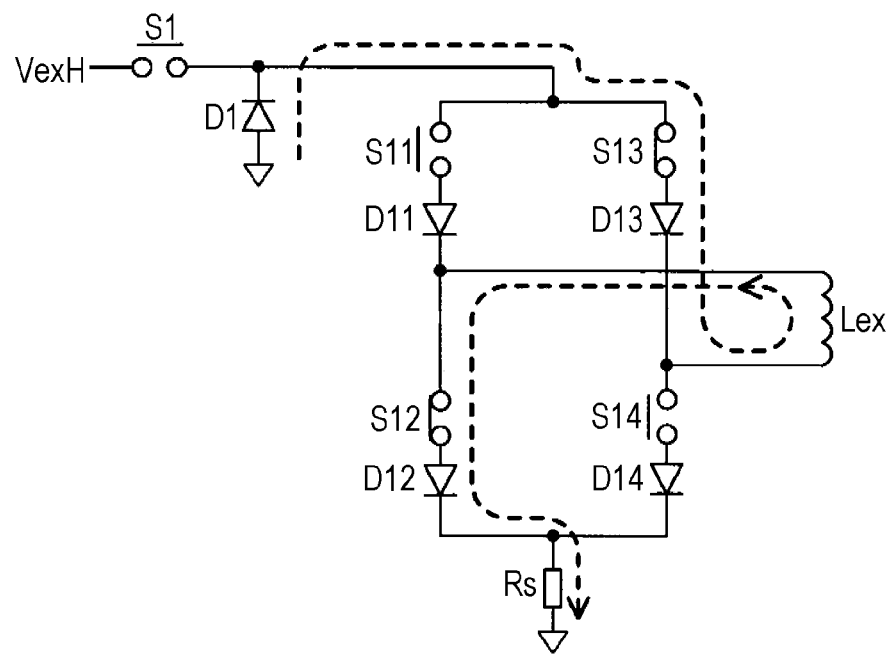
FIG. 3D illustrates a flow path of an excitation current having a negative polarity when high-speed switch is in an off state in the excitation circuit according to the first embodiment.

As illustrated in FIG. 3D, when the high-speed switch S1 is turned off, in contrast, the energy stored in the excitation coil Lex when the high-speed switch S1 is in the on state allows current to flow into the signal line VexCOM from the signal line VexCOM via the diode D1, the low-speed switch S13, the diode D13, the excitation coil Lex, the low-speed switch S12, the diode D12, and the current-detecting resistor Rs. Accordingly, the excitation current Iex having a negative polarity is held even in the period during which the high-speed switch S1 is in the off state.

The diodes D11 to D14, which serve as backflow prevention elements, will now be described in detail.

As described above, the diodes D11 to D14 are backflow prevention elements for preventing the excitation current Iex from flowing in paths other than a path that passes through the current-detecting resistor Rs (see FIGS. 3A to 3D) when the high-speed switch S11 is turned off.

Figure 4:
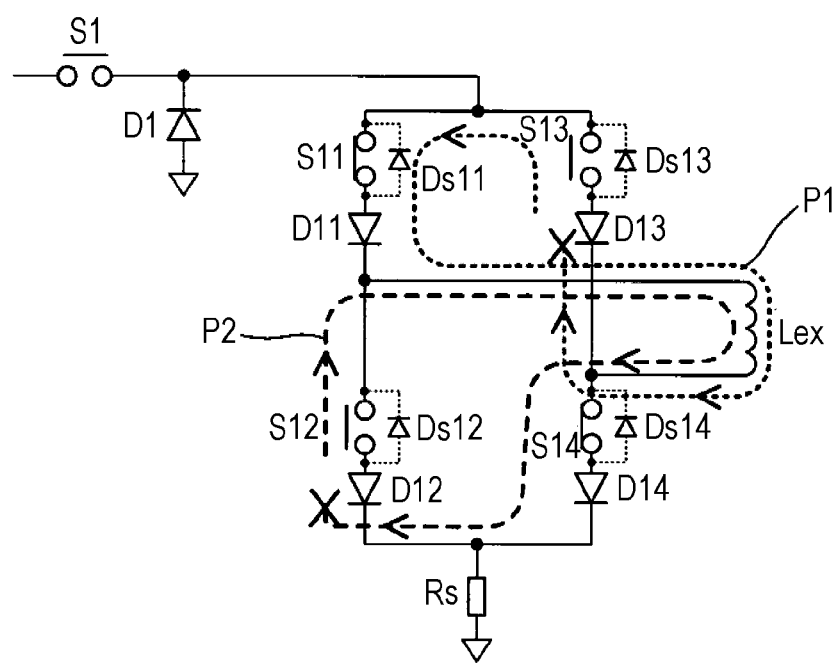
FIG. 4 illustrates the operation of a backflow prevention element.

For example, metal oxide semiconductor field-effect transistors (MOSFETs) are used as the switch elements ST on the secondary side of the low-speed switches S11 to S14, parasitic diodes Ds11 to Ds14 are each present between the drain and source of a corresponding one of the MOSFETs. Due to the presence of the parasitic diodes Ds11 to Ds14, for example, when the high-speed switch S11 is switched from the on state to the off state while the excitation polarity is kept positive (while the low-speed switches S11 and S14 are in the on state and the low-speed switches S12 and S13 are in the off state), current may flow in a path P1 and a path P2 illustrated in FIG. 4. In this case, the diodes D12 and D13 respectively disposed in series with the low-speed switches S12 and S13 can prevent current from flowing in the paths P1 and P2.

Likewise, when the high-speed switch S1 is switched from the on state to the off state while the excitation polarity is kept negative (while the low-speed switches S11 and S14 are in the off state and the low-speed switches S12 and S13 are in the on state), the diodes D11 and D14 respectively disposed in series with the low-speed switches S11 and S14 can prevent backflow of current.

As described above, the diodes D11 to D14 disposed as appropriate as backflow prevention elements enable all of the excitation current Iex to flow through the current-detecting resistor Rs in a period during which the high-speed switch S1 is in the off state. That is, even in a situation where current flowing through the parasitic diodes Ds11 to Ds14 of the MOSFETs of the low-speed switches S11 to S14 is likely to occur, the backflow of the excitation current Iex can be prevented and all of the excitation current Iex can be caused to flow into the current-detecting resistor Rs. Thus, even in the presence of disturbance factors such as variations in the power supply voltage VexH or a change in coil resistance due to the heat generation of the excitation coil Lex, the feedback control in steps ST2 to ST7 described above enables the excitation current to be kept at a constant value, which leads to more accurate measurement and control of the excitation current Iex.

Figure 5:
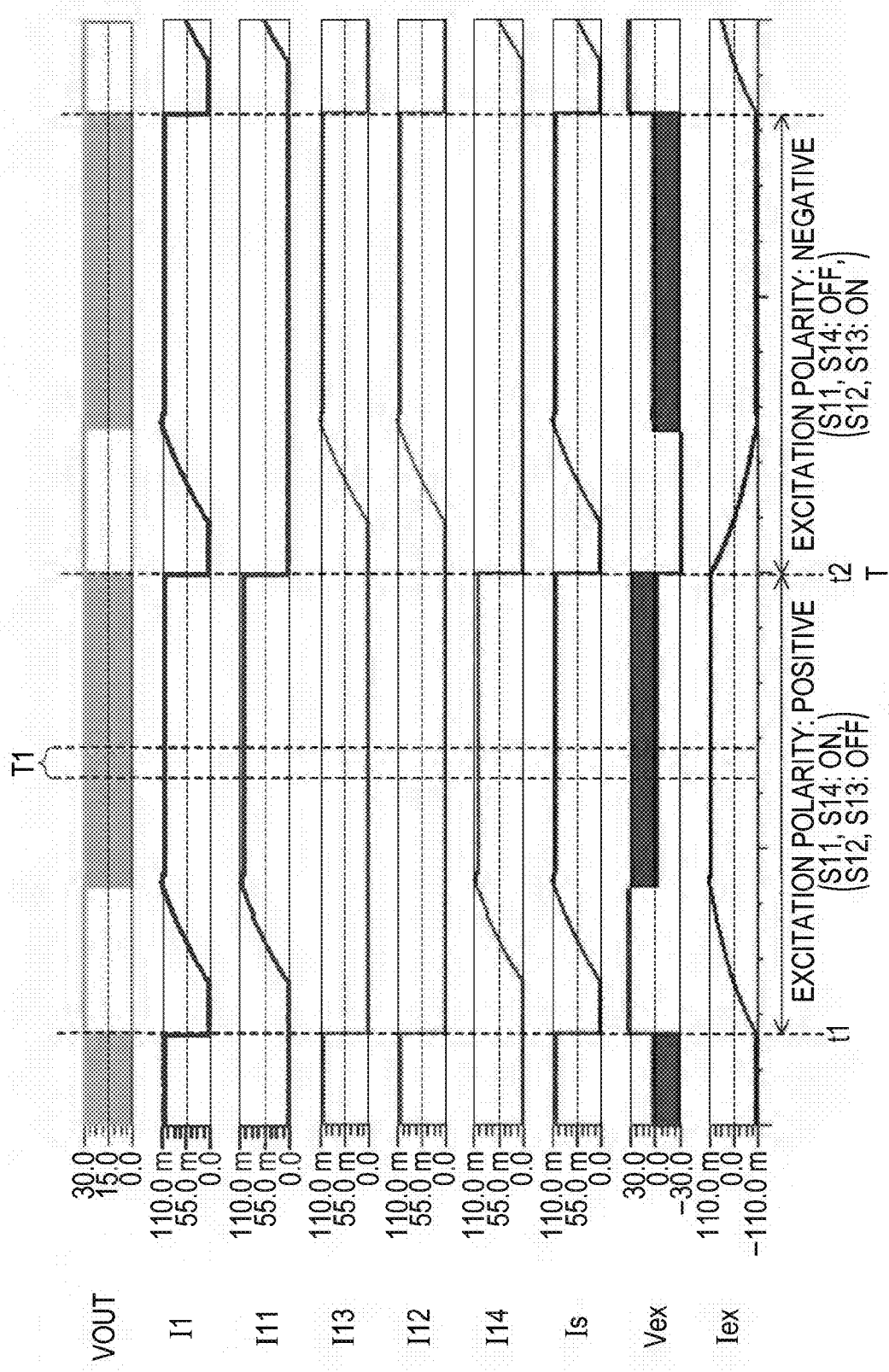
FIG. 5 is a timing chart illustrating voltages and currents at individual nodes during the operation of the excitation circuit according to the first embodiment.
Figure 6:
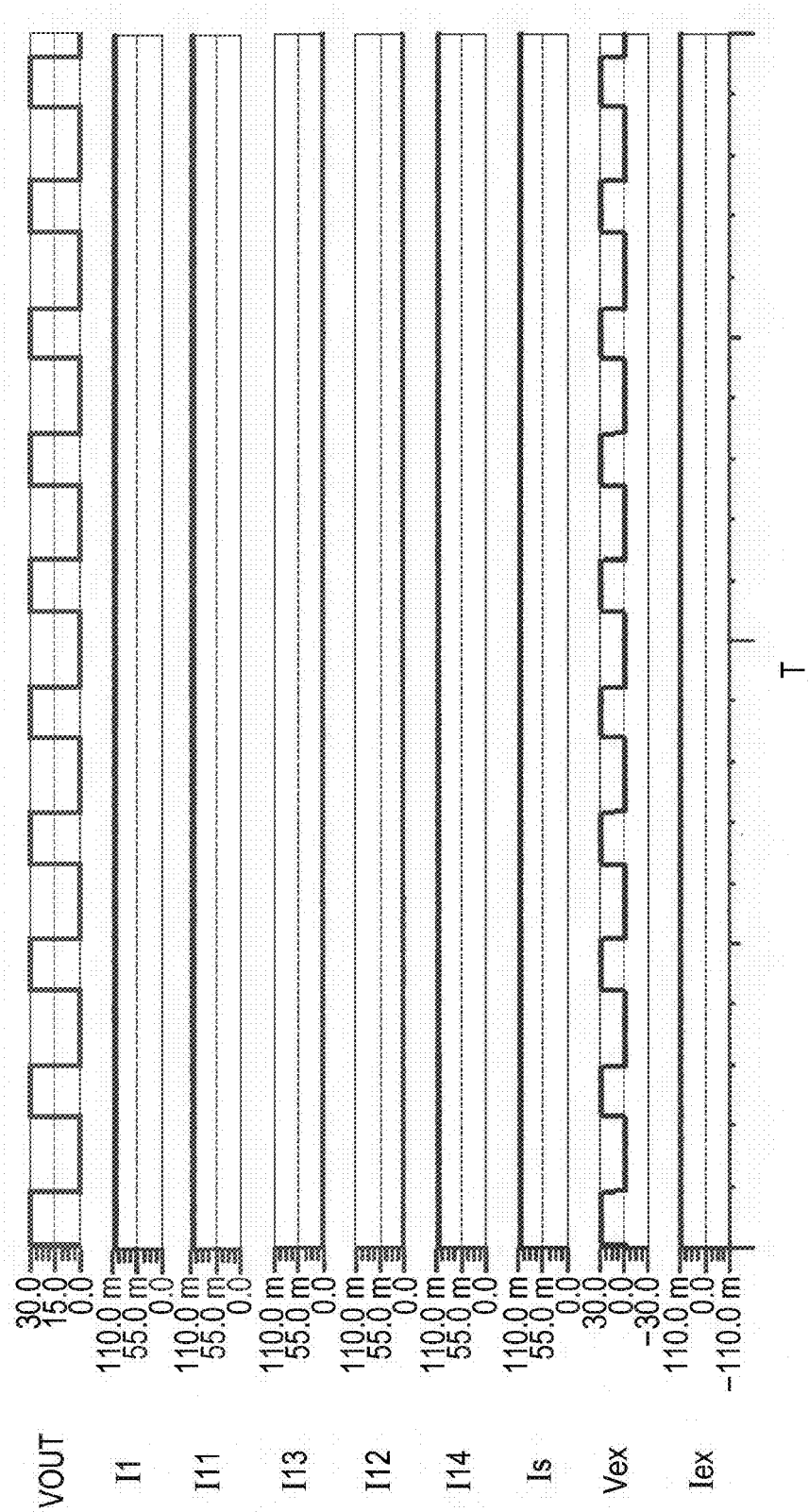
FIG. 6 is an enlarged view of the timing chart illustrated in FIG. 5.

FIGS. 5 and 6 are timing charts illustrating voltages and currents at the individual nodes of the excitation circuit 15.

Figure 7:
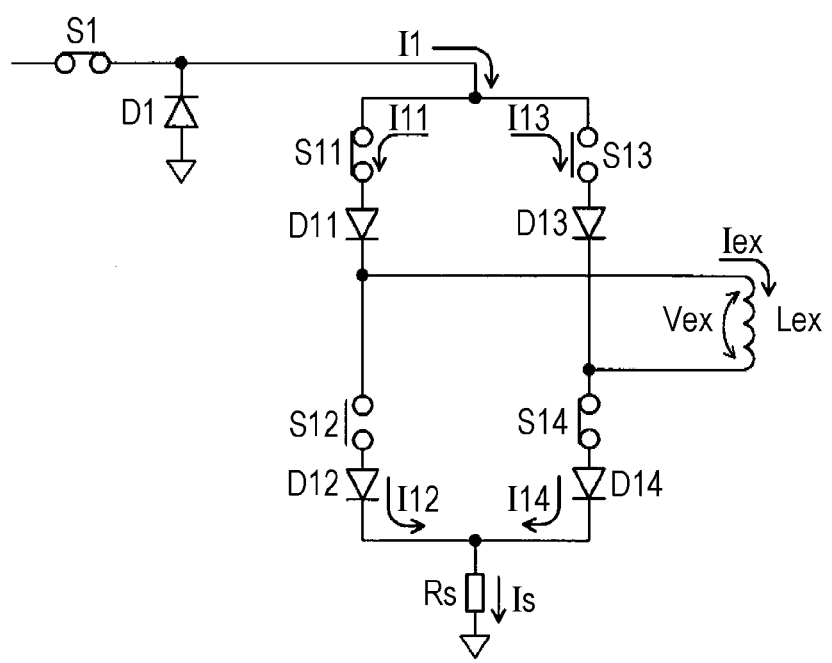
FIG. 7 illustrates correspondences of voltages and currents in the excitation circuit according to the first embodiment and voltages and currents having the waveforms illustrated in FIG. 5.

FIG. 5 illustrates the results of simulation performed with excitation DC voltage VexH being equal to 30 V, the target current value of the excitation current Iex being set to 100 mA (absolute value), and a PWM signal obtained by the switching control circuit 150 having a maximum duty ratio (maximum pulse width) of 100%, FIG. 6 illustrates the waveforms of the voltages and currents within a period T1 illustrated in FIG. 5. The reference numerals used to identify the waveforms of the voltages and currents illustrated in FIGS. 5 and 6 correspond to the reference numerals used in the excitation circuit 15 illustrated in FIG. 7.

As illustrated in FIG. 5, at time t1, when the excitation polarity of the excitation coil Lex is switched from negative to positive (when the switches S11 and S14 are turned on and the switches S12 and S13 are turned off), a current Is of the current-detecting resistor Rs is 0 mA. At this time, since the current Is of the current-detecting resistor Rs is far from the target current value (100 mA), the switching control circuit 150 drives the high-speed switch S1 with the duty ratio of the PWM signal being maximized (100%). Accordingly, the excitation current Iex gradually increases in the positive direction, and the current Is of the current-detecting resistor Rs gradually increases in the positive direction.

Thereafter, when the current Is of the current-detecting resistor Rs reaches the target current value (100 mA), as illustrated in FIG. 6, the switching control circuit 150 drives the high-speed switch S1 with the duty ratio of the PWM signal being reduced so that the current Is of the current-detecting resistor Rs matches the target current value (100 mA). Accordingly, the excitation current Iex is set to a constant positive value (+100 mA).

At time t2, the excitation polarity of the excitation coil Lex is switched from positive to negative (the switches S11 and S14 are turned off and the switches S12 and S13 are turned on). Then, the current Is of the current-detecting resistor Rs becomes 0 mA. Thus, the switching control circuit 150 drives the high-speed switch S1 with the duty ratio of the PWM signal being maximized (100%). Accordingly, the excitation current Iex gradually increases in the negative direction, and the current Is of the current-detecting resistor Rs gradually increases in the positive direction.

Thereafter, when the current Is of the current-detecting resistor Rs reaches the target current value (100 mA), the switching control circuit 150 drives the high-speed switch S1 with the duty ratio of the PWM signal being reduced so that the current Is of the current-detecting resistor Rs matches the target current value (100 mA). Accordingly, the excitation current Iex is set to a constant negative value (−100 mA).

In the excitation circuit 15 according to this embodiment, unlike the excitation circuit disclosed in Patent Literature 2 described above, DC conversion of the excitation voltage Vex is not performed using a capacitor. Thus, the on/off switching operation of the high-speed switch S1 causes ripple current. If the ripple current is large, the ripple current adversely affects a flow rate signal, which may cause an error in flow rate measurement or variations in measured value.

Thus, to further increase the accuracy of the electromagnetic flow meter 10, it is desirable to sufficiently increase the switching frequency of the high-speed switch S1 relative to the inductance of the excitation coil Lex. An example of setting the switching frequency of the high-speed switch S1 to suppress ripple current will be given hereinafter.

When the switching frequency is represented by $f_{sw}$, the inductance of the excitation coil Lex is represented by Lex, the power supply voltage to be supplied to the first end of the high-speed switch S1 is represented by VexH, and the average value of the voltage applied to the excitation coil Lex is represented by Vex_ave, ripple current $\Delta$Iex is typically expressed by Equation (1).

$$\Delta Iex = \frac{1}{f_{sw}} \times \frac{\text{Vex\_ave}}{\text{VexH}} \times (\text{VexH} - \text{Vex\_ave}) \times \frac{1}{\text{Lex}} \quad (1)$$

Given that the average value (central value) of the excitation current Iex is represented by Iex_ave and the resistance value of the excitation coil Lex is represented by Rex, the average value Vex_ave of the voltage applied to the excitation coil Lex is expressed by Equation (2). Thus, by substituting Equation (2) into Equation (1), the ripple current $\Delta$Iex is expressed by Equation (3).

$$\text{Vex\_ave} = \text{Iex\_ave} \times \text{Rex} \quad (2)$$

$$\Delta Iex = \frac{1}{f_{sw}} \times \frac{(\text{Iex\_ave} \times \text{Rex})}{\text{VexH}} \times (\text{VexH} - \text{Iex\_ave} \times \text{Rex}) \times \frac{1}{\text{Lex}} \quad (3)$$

For example, in an electromagnetic flow meter with flow rate measurement accuracy having a value of "±0.5%" in specifications, the excitation DC voltage VexH is 30 V, and the excitation current Iex whose average value (central value) Iex_ave is 150 mA is caused to flow through the excitation coil Lex whose inductance Lex is 100 mH and resistance value Rex is 100Ω. In this case, the ripple current $\Delta$Iex of the excitation current Iex is desirably within at least the value of the flow rate measurement accuracy in specifications (i.e., ±0.5%).

In this case, for example, substituting a switching frequency $f_{sw}$ of "50 kHz" into Equation (3) yields a ripple current $\Delta$Iex of "1.5 mA", which accounts for 1% of the average value Iex_ave (=150 mA) of the excitation current Iex, that is, "±0.5%". This value is acceptable for use in practical electromagnetic flow meters.

For example, if the switching frequency $f_{sw}$ is "500 kHz", from Equation (3), the ripple current $\Delta$Iex is "0.15 mA", which accounts for 0.1% of the average value Iex_ave (=150 mA) of the excitation current Iex, that is, "±0.05%". This value enables ripple current to have a substantially negligible effect on flow rate measurement.

Advantages of Excitation Circuit According to Present Disclosure

In an excitation circuit according to the present disclosure, as described above, the low-speed switches S11 to S14 for switching the excitation polarity, the high-speed switch S1 for directly pulse-driving the excitation coil Lex to perform constant current control of the excitation current, the current-detecting resistor Rs, and the excitation coil Lex are connected in the manner illustrated in FIG. 2A, and the high-speed switch S1 is driven by the switching control circuit 150 separately from the low-speed switches S11 to S14 in such a manner as to keep the current flowing through the current-detecting resistor Rs constant. This eliminates the need for a component that generates a large amount of heat, such as a power transistor, to perform constant-current control of the excitation current, unlike the excitation circuit disclosed in Patent Literature 1 described above. This configuration enables an increase in the excitation current without using a radiator, thereby achieving a small electromagnetic flow meter while improving measurement stability with an increased signal level of a flow rate signal.

In addition, due to the circuit configuration in which the excitation coil Lex is directly pulse-driven, the excitation circuit eliminates the need for a DC conversion circuit constituted by an inductor and a stabilization capacitor (output capacitor) for converting the excitation voltage into a DC voltage, unlike the excitation circuit disclosed in Patent Literature 2 described above, which results in an increase in circuit response. It is therefore possible to increase the excitation frequency and improve measurement stability.

In the excitation circuit, furthermore, since the potential of a first end of the current-detecting resistor Rs and the reference potential for the switching control circuit 150 are common (VexCOM), a second end of the current-detecting resistor Rs can be directly connected to the inverting input terminal of the error amplifier circuit 151 of the switching control circuit 150. This configuration eliminates the need for separate power supplies that are isolated from each other to detect current, a special signal conversion circuit, and the like, unlike the excitation circuit in Patent Literature 3 described above, which does not cause an increase in the complexity of the excitation circuit and enables size reduction of the electromagnetic flow meter.

In addition, the excitation circuit has a configuration in which the low-speed switches S11 to S14 for switching the excitation polarity and the high-speed switch S1 for directly pulse-driving the excitation coil Lex to perform constant current control of the excitation current are separately controlled. This configuration enables a drive circuit for driving the low-speed switches S11 to S14 to be implemented with a simpler circuit configuration and enables size reduction of the electromagnetic flow meter.

For example, the excitation circuit in Patent Literature 3 described above employs a circuit configuration in which a set of high-side switches are used for both switching of the excitation polarity and pulse driving of an excitation coil, which requires high-speed switching of the high-side switches at a minimum switching frequency of 10 kHz, leading to an increase in the complexity of a drive circuit for driving the high-side switches. In the excitation circuit according to the present disclosure, in contrast, the low-speed switches S11 to S14 are responsible only for the switching of the excitation polarity, which only requires switching of the low-speed switches S11 to S14 at a switching frequency up to 1 kHz. It is therefore possible to implement a drive circuit for driving the low-speed switches S11 to S14 with a simple circuit configuration.

In the excitation circuit, furthermore, a general-purpose power supply IC (DC-DC converter control IC) is available as the switching control circuit 150, which enables a further reduction in the size of the electromagnetic flow meter.

As described above, the excitation circuit according to an embodiment of the present disclosure can achieve both size reduction and improvement in measurement stability, which makes it possible to achieve a small electromagnetic flow meter having high measurement stability.

In the excitation circuit 15 according to the first embodiment, furthermore, as illustrated in FIGS. 2A and 2B, the diodes D11 to D14 are respectively connected in series with the low-speed switches S11 to S14. Thus, when MOSFETs are used as switch elements on the secondary side of the low-speed switches S11 to S14, backflow of current via the parasitic diodes Ds11 to Ds14, each of which is present between the drain and source of a corresponding one of the MOSFETs, can be prevented.

Accordingly, as described above, even in a situation where current passing through the parasitic diodes Ds11 to Ds14 of the low-speed switches S11 to S14 is likely to occur, all of the excitation current Iex can be caused to flow into the current-detecting resistor Rs, which enables more accurate measurement and control of the excitation current even in the presence of disturbance factors such as variations in the power supply voltage VexH.

In addition, the diodes D11 to D14 are respectively connected in series with the low-speed switches S11 to S14, which can prevent a voltage exceeding the withstand voltage from being applied to the low-speed switches S11 to S14 due to the counter electromotive force of the excitation coil Lex, which is generated when the excitation polarity is switched.

Second Embodiment

Configuration of Excitation Circuit According to a Second Embodiment

Figure 8:
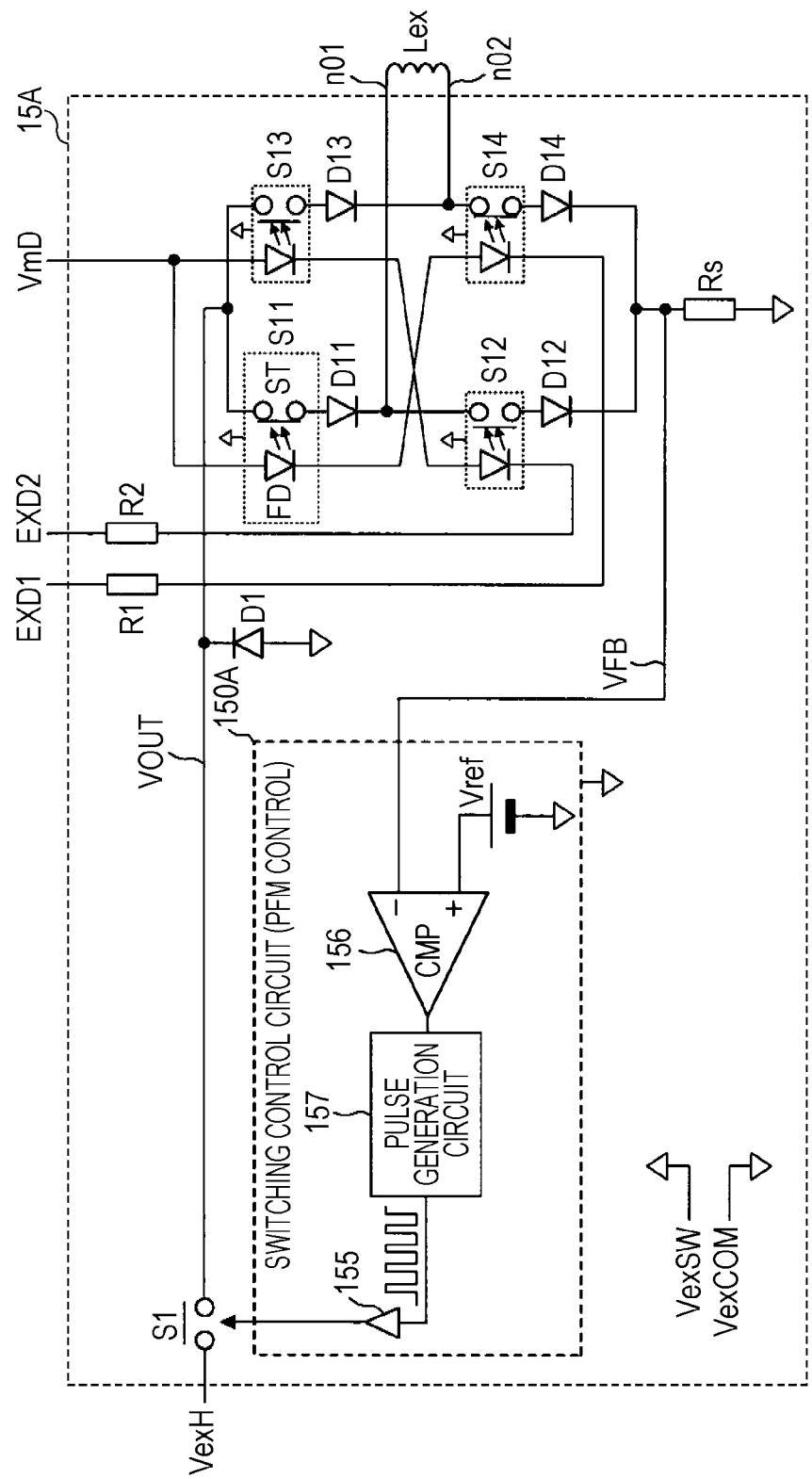
FIG. 8 illustrates the configuration of an excitation circuit according to a second embodiment.

FIG. 8 illustrates the configuration of an excitation circuit according to a second embodiment.

An excitation circuit 15A illustrated in FIG. 8 is different from the excitation circuit 15 according to the first embodiment in that a switching control circuit drives the high-speed switch S1 by using pulse frequency modulation (PFM) control, and other features are similar to those of the excitation circuit 15 according to the first embodiment.

Specifically, the excitation circuit 15A includes a circuit for driving the high-speed switch S1, namely, a switching control circuit 150A for controlling the high-speed switch S1 in accordance with the detection voltage VFB of the current-detecting resistor Rs by using the PFM technique.

The switching control circuit 150A generates a PFM signal whose frequency is variable in accordance with a difference between the current flowing through the current-detecting resistor Rs and a target current value and performs switching of the high-speed switch S1 based on the PFM signal.

The switching control circuit 150A can be exemplified by, as illustrated in FIG. 8, a circuit constituted by a comparator (CMP) 156, a pulse generation circuit 157, and the drive circuit 155.

The comparator (CMP) 156 compares the reference voltage Vref corresponding to the target current value of the excitation current Iex with the detection voltage VFB obtained by the current-detecting resistor Rs and outputs a comparison result. The pulse generation circuit 157 outputs a binary signal having a fixed pulse width (on-time) at intervals based on the comparison result of the comparator 156. The drive circuit 155 buffers the binary signal (PFM signal) output from the pulse generation circuit 157 and drives the high-speed switch S1, which is constituted by a power transistor.

Advantages of Excitation Circuit According to the Second Embodiment

The excitation circuit 15A according to the second embodiment, which includes no error amplifier circuit (or phase compensator), provides a higher response speed than that based on the PWM technique. It is therefore possible to further increase the excitation frequency and to further improve the measurement stability of the electromagnetic flow meter.

Third Embodiment

Configuration of Excitation Circuit According to a Third Embodiment

Figure 9:
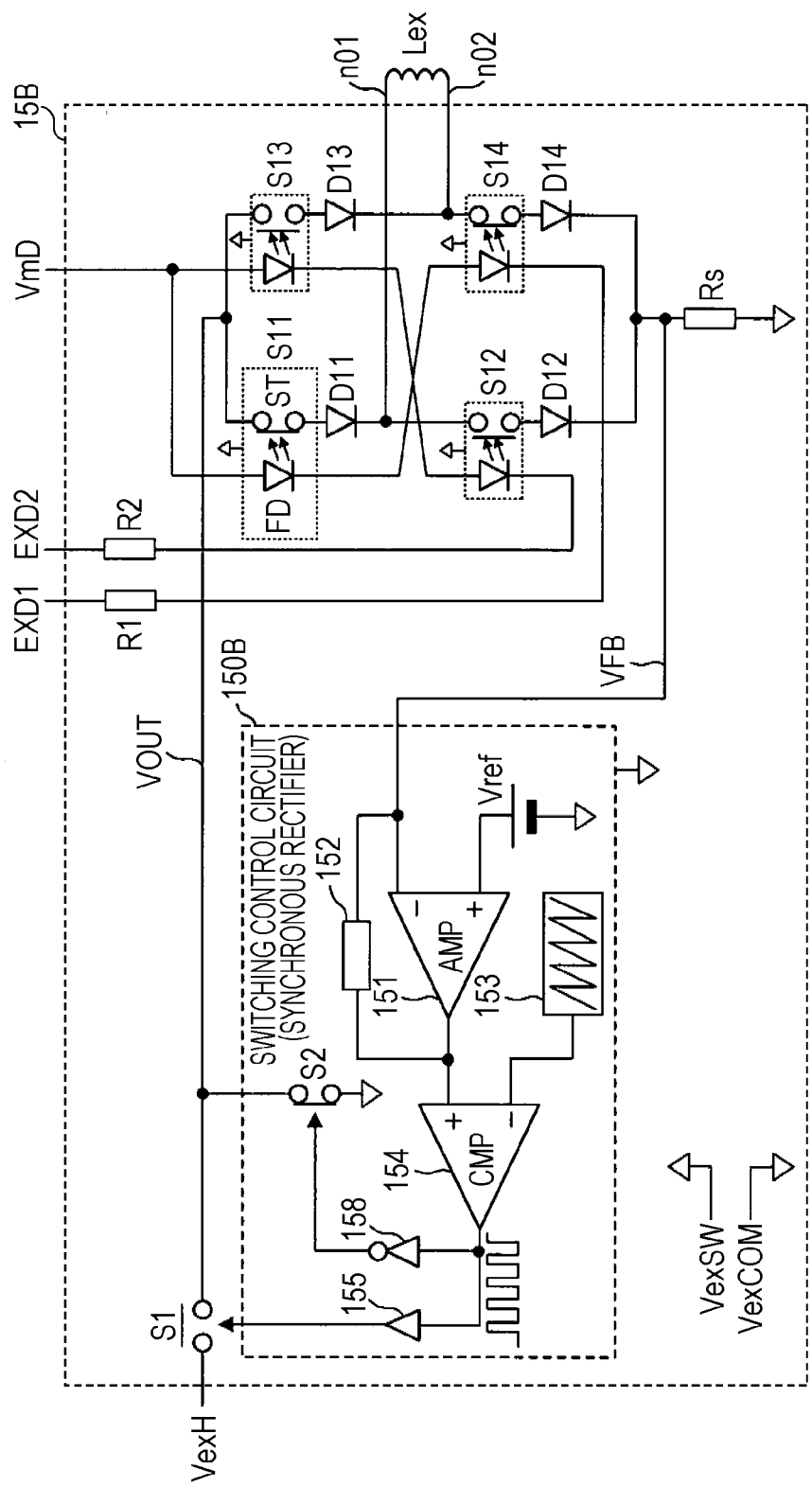
FIG. 9 illustrates the configuration of an excitation circuit according to a third embodiment.

FIG. 9 illustrates the configuration of an excitation circuit according to a third embodiment.

Unlike the excitation circuit 15 according to the first embodiment, an excitation circuit 15B illustrated in FIG. 9 includes a synchronous rectifier switching control circuit in which a diode serving as a current-returning element is replaced by a switch, and other features are similar to those of the excitation circuit 15 according to the first embodiment.

Specifically, the excitation circuit 15B includes a circuit for driving the high-speed switch S1, namely, a synchronous rectifier switching control circuit 150B.

The switching control circuit 150B further includes a synchronous rectifier switch S2 and a drive circuit 158 in addition to the configuration of the switching control circuit 150 according to the first embodiment.

The synchronous rectifier switch S2 is a current-returning element disposed instead of the (flywheel) diode D1 and is connected between the signal line VOUT and the signal line VexCOM. The synchronous rectifier switch S2 can be exemplified by a power transistor, similarly to the high-speed switch S1.

The drive circuit 158 buffers a PWM signal output from the comparator 154 and drives the synchronous rectifier switch S2 with logic inverted.

In the switching control circuit 150B, the on and off states of the high-speed switch S1 and the synchronous rectifier switch S2 are alternately switched. That is, when the high-speed switch S1 is in an on state, the synchronous rectifier switch S2 is in an off state, in which case current flows into the excitation coil Lex from the signal line VexH via the high-speed switch S1. On the other hand, when the high-speed switch S1 is in an off state, the synchronous rectifier switch S2 is in an on state, in which case current flows into the excitation coil Lex from the signal line VexCOM via the synchronous rectifier switch S2.

In this way, the excitation circuit 15B including the synchronous rectifier switching control circuit 150B enables the excitation current Iex to return in accordance with switching between the on and off states of the high-speed switch S1 in a way similar to that in the excitation circuit 15 according to the first embodiment including the diode DL.

Advantages of Excitation Circuit According to the Third Embodiment

The excitation circuit 15B according to the third embodiment eliminates the heat generation of the diode D1, which enables a further increase in excitation current and enables further improvement in the measurement stability of the electromagnetic flow meter.

Fourth Embodiment

Configuration of Excitation Circuit According to a Fourth Embodiment

Figure 10:
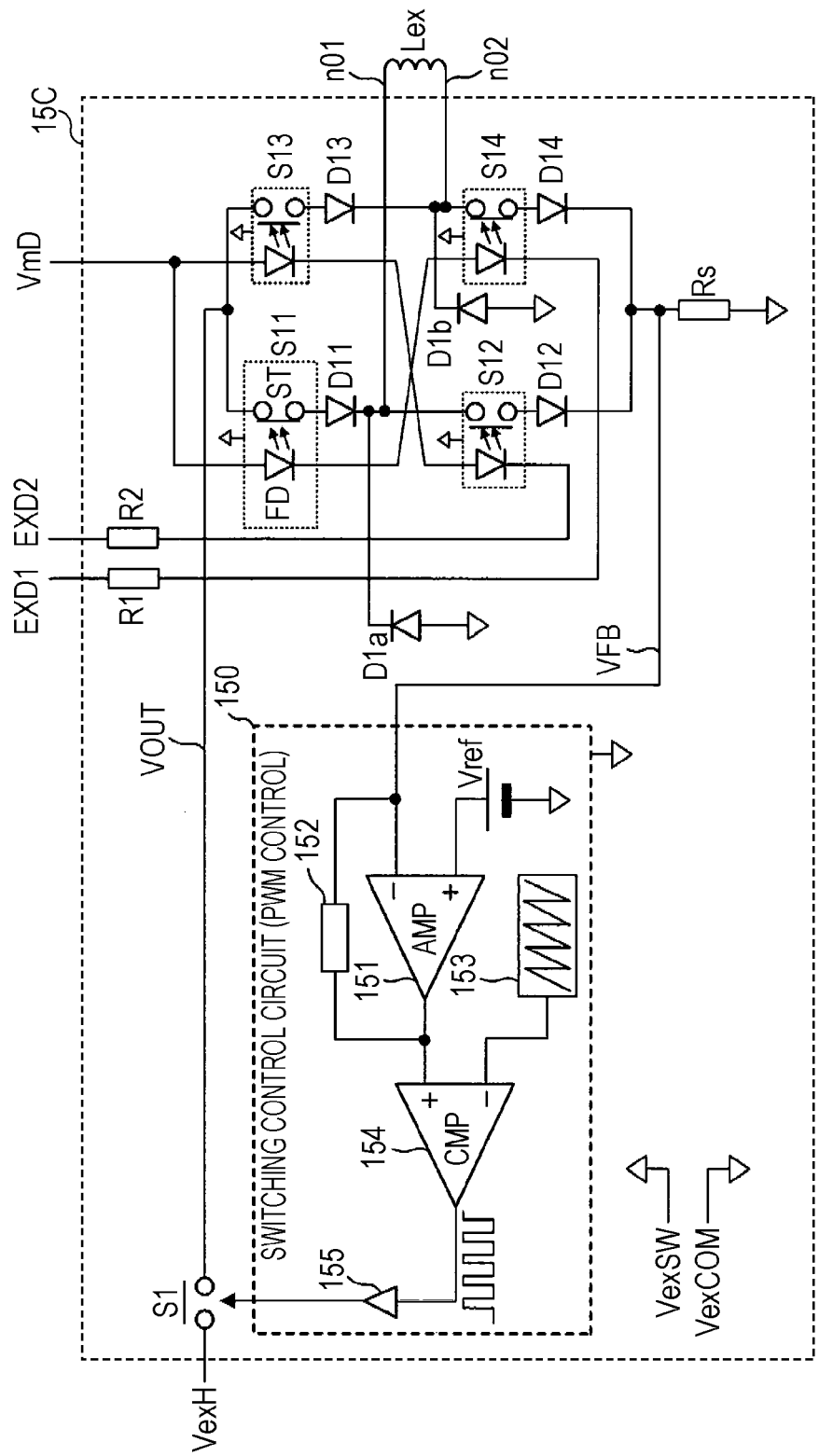
FIG. 10 illustrates the configuration of an excitation circuit according to a fourth embodiment.

FIG. 10 illustrates the configuration of an excitation circuit according to a fourth embodiment.

Unlike the excitation circuit 15 according to the first embodiment, an excitation circuit 15C illustrated in FIG. 10 includes two flywheel diodes that serve as current-returning elements, and other features are similar to those of the excitation circuit 15 according to the first embodiment.

Specifically, the excitation circuit 15C includes diodes D1a and D1b, instead of the diode D1, as current-returning elements. The diode D1a has an anode connected to the signal line VexCOM and a cathode connected to the first end (node n01) of the excitation coil Lex. The diode D1b has an anode connected to the signal line VexCOM and a cathode connected to the second end (node n02) of the excitation coil Lex.

Here, a flow path of the excitation current Iex in the excitation circuit 15C will be described with reference to the drawings.

FIGS. 11A to 11D illustrate flow paths of an excitation current in the excitation circuit 15C according to the fourth embodiment. In FIGS. 11A to 11D, only a circuit configuration that is part of the excitation circuit 15C is illustrated.

First, the description will be given of flow paths of current whose excitation polarity is "positive".

Figure 11A:
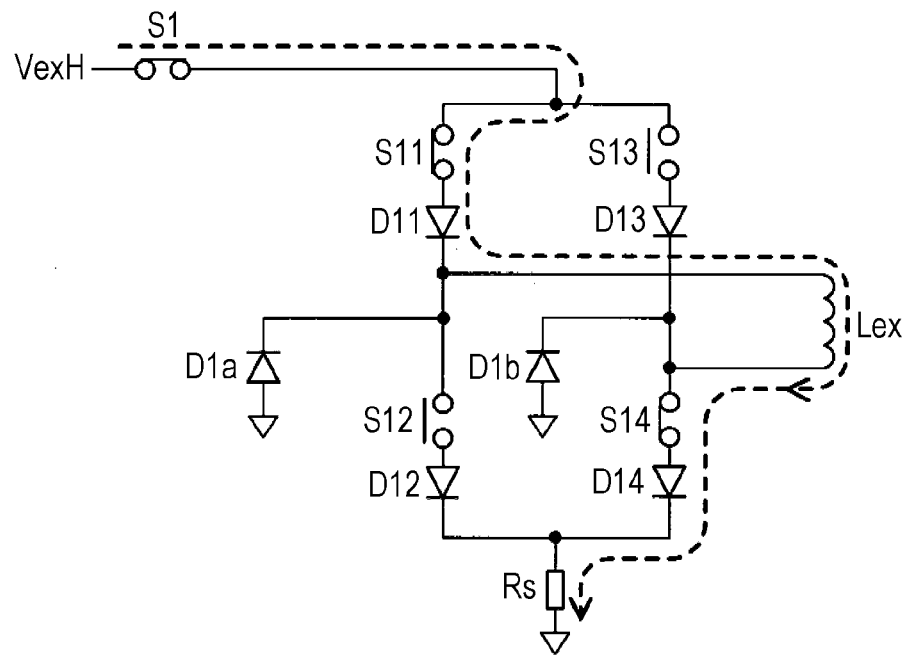
FIG. 11A illustrates a flow path of an excitation current having a positive polarity when a high-speed switch is in an on state in the excitation circuit according to the fourth embodiment.

When the excitation polarity is "positive", the low-speed switches S11 and S14 are turned on and the low-speed switches S12 and S13 are turned off. In this state, the flow path of current when the high-speed switch S1 is turned on is similar to that in the excitation circuit 15 according to the first embodiment. Specifically, as illustrated in FIG. 11A, the excitation current Iex flows into the signal line VexCOM from the signal line VexH via the high-speed switch S1, the low-speed switch S11, the diode D11, the excitation coil Lex, the low-speed switch S14, the diode D14, and the current-detecting resistor Rs, and the excitation coil Lex is excited to the positive polarity. In this case, energy is stored in the excitation coil Lex.

Figure 11B:
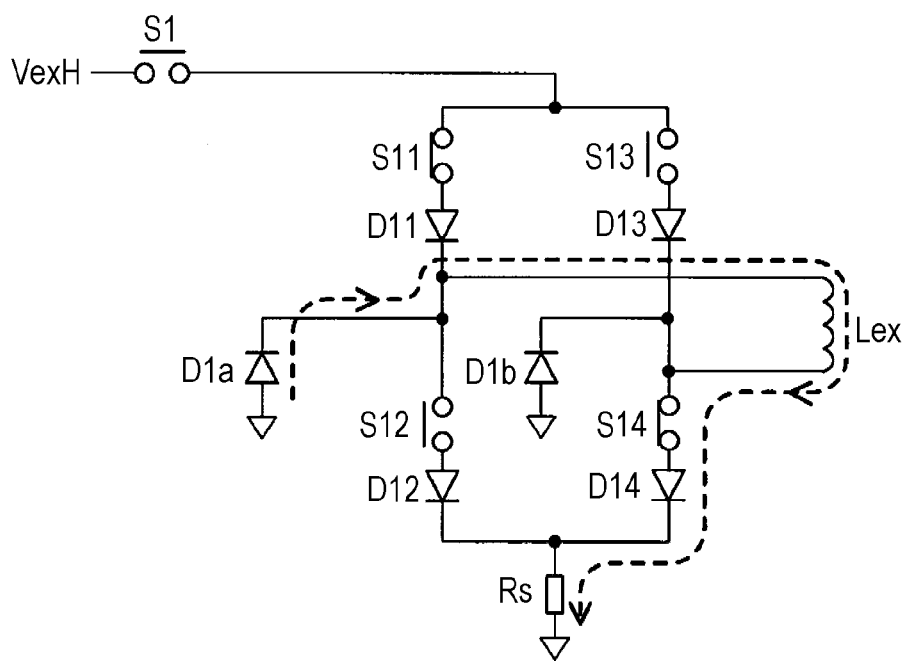
FIG. 11B illustrates a flow path of an excitation current having a positive polarity when high-speed switch is in an off state in the excitation circuit according to the fourth embodiment.

When the high-speed switch S1 is turned off, on the other hand, as illustrated in FIG. 11B, the energy stored in the excitation coil Lex when the high-speed switch S1 is in the on state allows current to flow into the signal line VexCOM from the signal line VexCOM via the diode D1a, the excitation coil Lex, the low-speed switch S14, the diode D14, and the current-detecting resistor Rs. Accordingly, the excitation current Iex having a positive polarity is held even in the period during which the high-speed switch S1 is in the off state.

Next, the description will be given of flow paths of current whose excitation polarity is "negative".

Figure 11C:
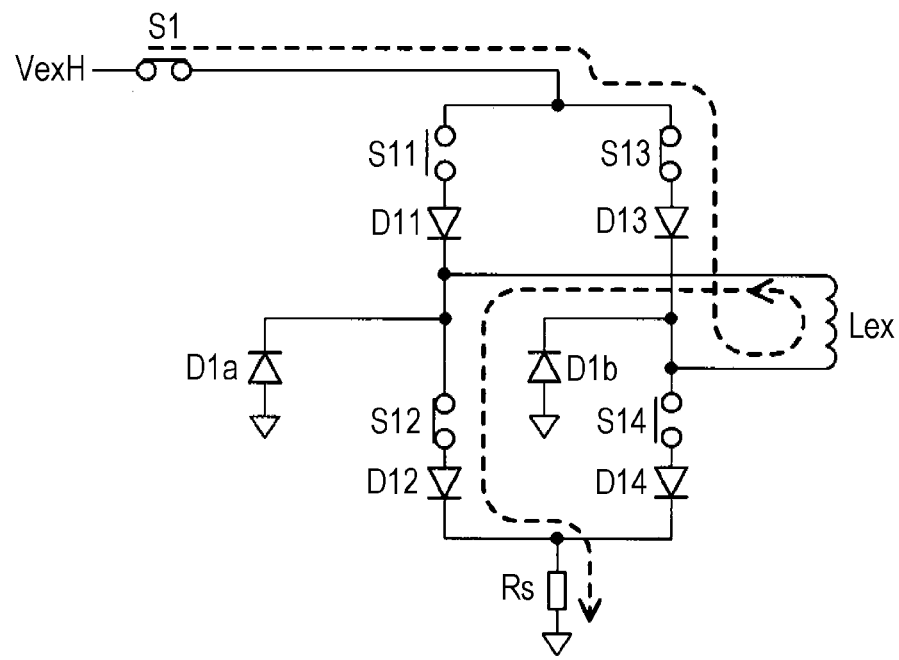
FIG. 11C illustrates a flow path of an excitation current having a negative polarity when high-speed switch is in an on state in the excitation circuit according to the fourth embodiment.

When the excitation polarity is "negative", the low-speed switches S11 and S14 are turned off and the low-speed switches S12 and S13 are turned on. In this state, the flow path of current when the high-speed switch S1 is turned on is similar to that in the excitation circuit 15 according to the first embodiment. Specifically, as illustrated in FIG. 11C, the excitation current Iex flows into the signal line VexCOM from the signal line VexH via the high-speed switch S1, the low-speed switch S13, the diode D13, the excitation coil Lex, the low-speed switch S12, the diode D12, and the current-detecting resistor Rs, and the excitation coil Lex is excited to the negative polarity. In this case, energy is stored in the excitation coil Lex.

Figure 11D:
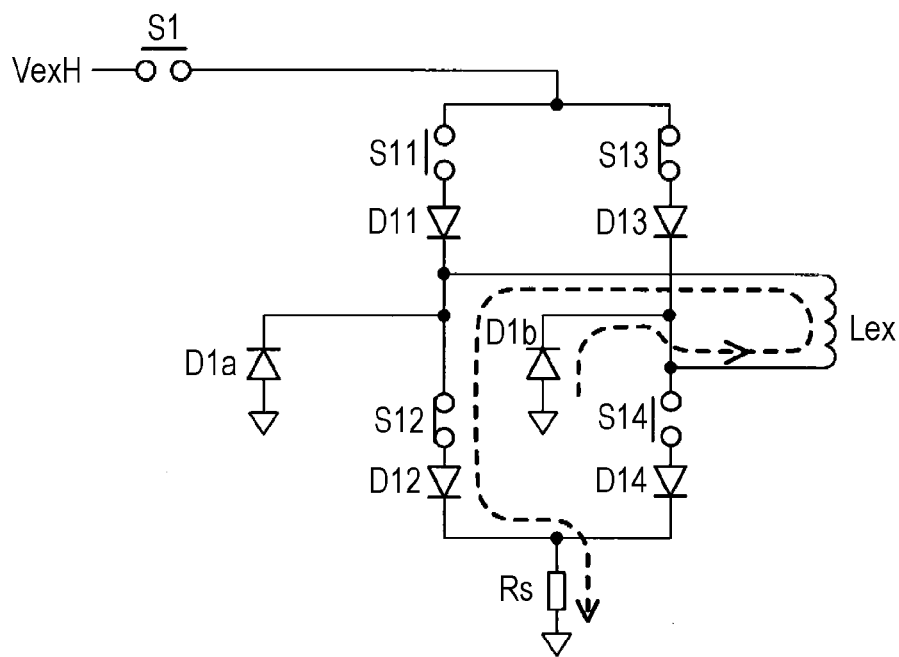
FIG. 11D illustrates a flow path of an excitation current having a negative polarity when high-speed switch is in an off state in the excitation circuit according to the fourth embodiment.

When the high-speed switch S1 is turned off, on the other hand, as illustrated in FIG. 11D, the energy stored in the excitation coil Lex when the high-speed switch S11 is in the on state allows current to flow into the signal line VexCOM from the signal line VexCOM via the diode D1b, the excitation coil Lex, the low-speed switch S12, the diode D12, and the current-detecting resistor Rs. Accordingly, the excitation current Iex having a negative polarity is held even in the period during which the high-speed switch S1 is in the off state.

Accordingly, the excitation circuit 15C enables the excitation current Iex to return via the diode D1a when the high-speed switch S1 is turned off in the case where the excitation polarity is positive, and enables the excitation current Iex to return via the diode D1b when the high-speed switch S1 is turned off in the case where the excitation polarity is negative.

Advantages of Excitation Circuit According to the Fourth Embodiment

In the excitation circuit 15C according to the fourth embodiment, the excitation current returns via different diodes, namely, the diodes D1a and D1b, when the excitation polarity is positive and negative, respectively, which can reduce the average value of the amount of heat generated per diode compared with when the current returns by using the single diode D1, regardless of the excitation polarity. This configuration enables a further increase in excitation current and enables further improvement in the measurement stability of the electromagnetic flow meter.

Fifth Embodiment

Configuration of Excitation Circuit According to a Fifth Embodiment

Figure 12:
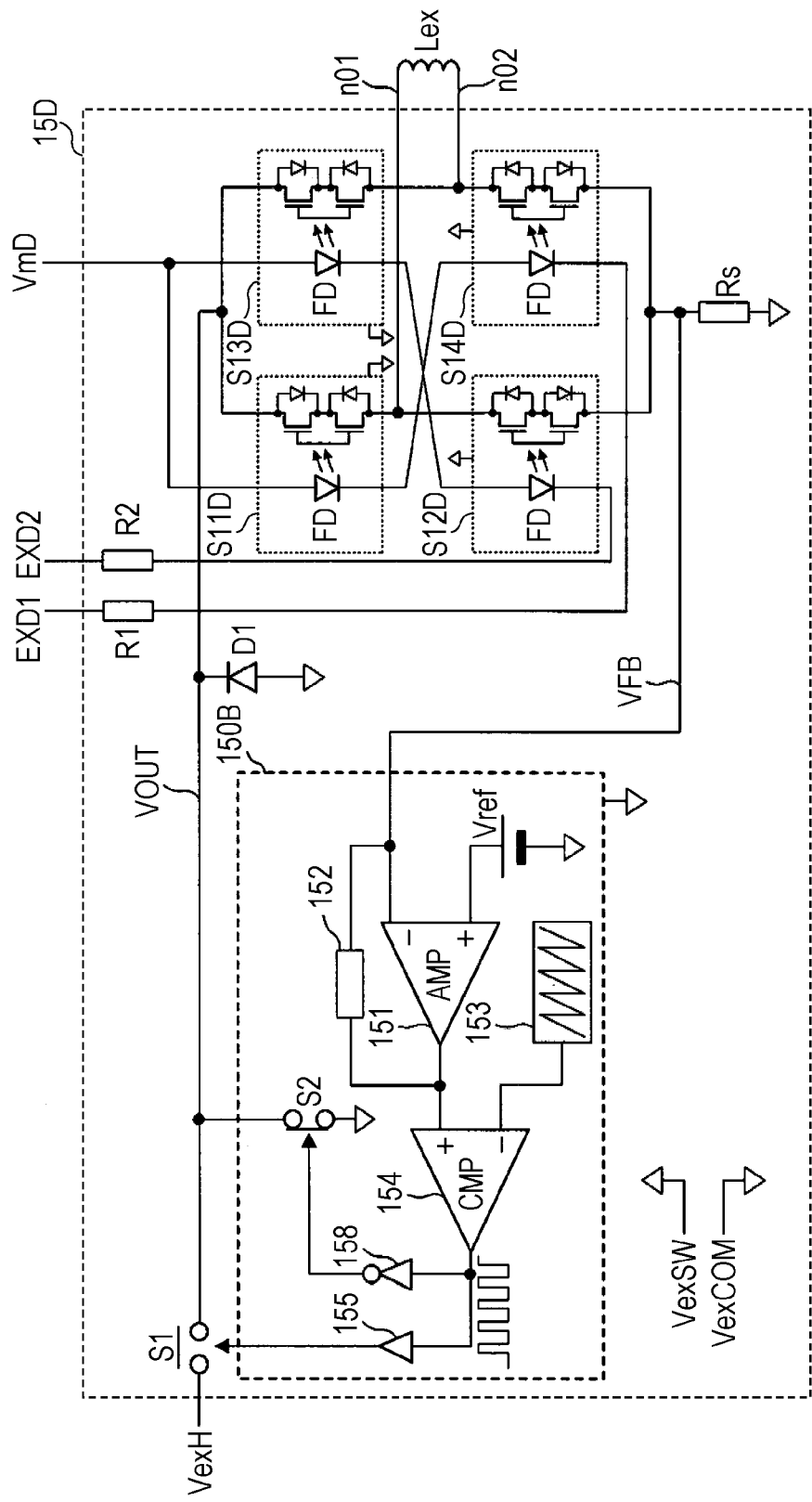
FIG. 12 illustrates the configuration of an excitation circuit according to a fifth embodiment.

FIG. 12 illustrates the configuration of an excitation circuit according to a fifth embodiment.

Unlike the excitation circuit 15 according to the third embodiment, an excitation circuit 15D illustrated in FIG. 12 includes, as a backflow prevention element, a switch circuit that includes a MOSFET instead of a diode, and other features are similar to those of the excitation circuit 15B according to the third embodiment.

Specifically, the excitation circuit 15D includes low-speed switch circuits S11D to S14D instead of the low-speed switches S11 to S14 and the diodes D11 to D14.

First, the high-side low-speed switch circuits S11D and S13D will be described.

Figure 13A:
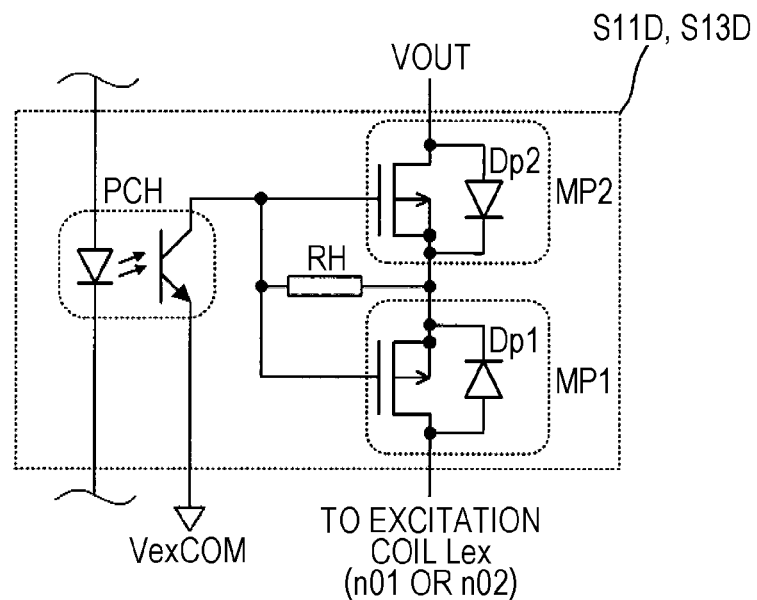
FIG. 13A illustrates the circuit configuration of high-side low-speed switch circuits.

FIG. 13A illustrates the circuit configuration of the high-side low-speed switch circuits S11D and S13D.

As illustrated in FIG. 13A, each of the high-side low-speed switch circuits S11D and S13D includes transistors MP1 and MP2, a resistor RH, and a photocoupler PCH.

The transistors MP1 and MP2 are P-channel MOSFETs, for example. The transistors MP1 and MP2 are connected in series other between the signal line VOUT and either terminal (the node n01 or the node n02) of the excitation coil Lex in such a manner that parasitic diodes Dp1 and Dp2 of the transistors MP1 and MP2 face each other. That is, in the case of the low-speed switch circuit S11D, the drain of the transistor MP1 is connected to the first end (n01) of the excitation coil Lex. In the case of the low-speed switch circuit S13D, the drain of the transistor MP1 is connected to the second end (n02) of the excitation coil Lex. The source and back gate of the transistor MP1 are connected to the source and back gate of the transistor MP2, and the drain of the transistor MP2 is connected to the signal line VOUT.

The gate of the transistor MP1 and the gate of the transistor MP2 are connected in common to the collector of a transistor on the secondary side of the photocoupler PCH, and the emitter of the transistor is connected to the signal line VexCOM. The resistor RH is connected between the gates of the transistors MP1 and MP2 and the sources of the transistors MP1 and MP2.

In the high-side low-speed switch circuits S11D and S13D, when current flows through a photodiode on the primary side of the photocoupler PCH, the transistor on the secondary side of the photocoupler PCH is turned on, which allows current to flow through the transistor on the secondary side of the photocoupler PCH via the parasitic diode Dp2 of the transistor MP2 and the resistor RH. Thus, the transistors MP1 and MP2 are turned on.

When no current flows through the photodiode on the primary side of the photocoupler PCH, in contrast, the transistor on the secondary side of the photocoupler PCH is turned off. Thus, the gates of the transistors MP1 and MP2 are set to a high level (VOUT) via the resistor RH and the parasitic diode Dp2, which results in the transistors MP1 and MP2 being turned off.

In this case, the backflow of current from the excitation coil Lex toward the signal line VOUT is blocked by the parasitic diode Dp2 of the transistor MP2. That is, the transistor MP2 functions as a switch for allowing current to pass from the signal line VOUT to the excitation coil Lex, together with the transistor MP1, and also functions as a backflow prevention element for preventing the backflow of current from the excitation coil Lex to the signal line VOUT.

Next, the low-side low-speed switch circuits S12D and S14D will be described.

Figure 13B:
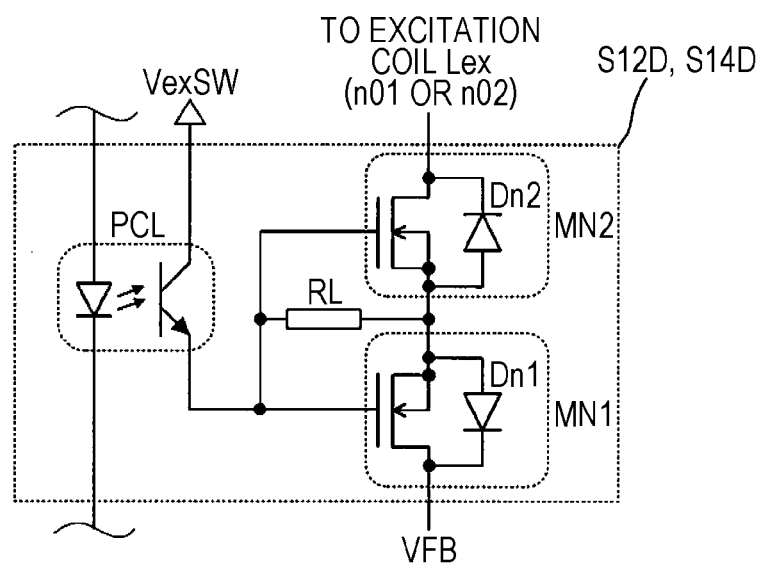
FIG. 13B illustrates the circuit configuration of low-side low-speed switch circuits.

FIG. 13B illustrates the circuit configuration of the low-side low-speed switch circuits S12D and S14D.

As illustrated in FIG. 13B, each of the low-side low-speed switch circuits S12D and S14D includes transistors MN1 and MN2, a resistor RL, and a photocoupler PCL.

The transistors MN1 and MN2 are N-channel MOSFETs, for example. The transistors MN1 and MN2 are connected in series other between either terminal (the node n01 or the node n02) of the excitation coil Lex and the signal line VFB in such a manner that parasitic diodes Dn1 and Dn2 of the transistors MN1 and MN2 face each other. That is, in the case of the low-speed switch circuit S12D, the drain of the transistor MN2 is connected to the first end (n01) of the excitation coil Lex. In the case of the low-speed switch circuit S14D, the drain of the transistor MN2 is connected to the second end (n02) of the excitation coil Lex. The source and back gate of the transistor MN2 are connected to the source and back gate of the transistor MN1, and the drain of the transistor MN1 is connected to the signal line VFB.

The gate of the transistor MN1 and the gate of the transistor MN2 are connected in common to the emitter of a transistor on the secondary side of the photocoupler PCL, and the collector of the transistor is connected to a signal line VexSW (>VexCOM). The resistor RL is connected between the gates of the transistors MN1 and MN2 and the sources of the transistors MN1 and MN2.

In the low-side low-speed switch circuits S12D and S14D, when current flows through a photodiode on the primary side of the photocoupler PCL, the transistor on the secondary side of the photocoupler PCL is turned on, which allows current to flow through the signal line VFB from the signal line VexSW via the transistor on the secondary side of the photocoupler PCL, the resistor RL, and the parasitic diode Dn1 of the transistor MN1. Thus, the transistors MN1 and MN2 are turned on.

When no current flows through the photodiode on the primary side of the photocoupler PCL, in contrast, the transistor on the secondary side of the photocoupler PCL is turned off. Thus, the gates of the transistors MN1 and MN2 are set to a low level (VFB) via the resistor RL and the parasitic diode Dn1, which results in the transistors MN1 and MN2 being turned off.

In this case, the backflow of current from the signal line VFB to the excitation coil Lex is blocked by the parasitic diode Dn1 of the transistor MN1. That is, the transistor MN1 functions as a switch for allowing current to pass from the excitation coil Lex to the signal line VFB, together with the transistor MN2, and also functions as a backflow prevention element for preventing the backflow of current from the signal line VFB to the excitation coil Lex.

Advantages of Excitation Circuit According to the Fifth Embodiment

In the excitation circuit 15D according to the fifth embodiment, the switch circuits S11D to S14D constituted by transistors are used, instead of the diodes D11 to D14, as backflow prevention elements, which eliminates the heat generation of the diodes D11 to D14. This configuration enables a further increase in excitation current and enables further improvement in the measurement stability of the electromagnetic flow meter. The excitation circuit 15D can also attain high efficiency as a power supply circuit.

Further, this configuration can reduce voltage drop in the diodes D11 to D14, which enables a reduction in the loss of the excitation voltage Vex. Therefore, the excitation circuit can also be applied to a battery-type (battery-driven) electromagnetic flow meter or a two-wire electromagnetic flow meter which would not otherwise be supplied with large voltage as the excitation DC voltage VexH (the output voltage VOUT).

Sixth Embodiment

Configuration of Excitation Circuit According to a Sixth Embodiment

Figure 14:
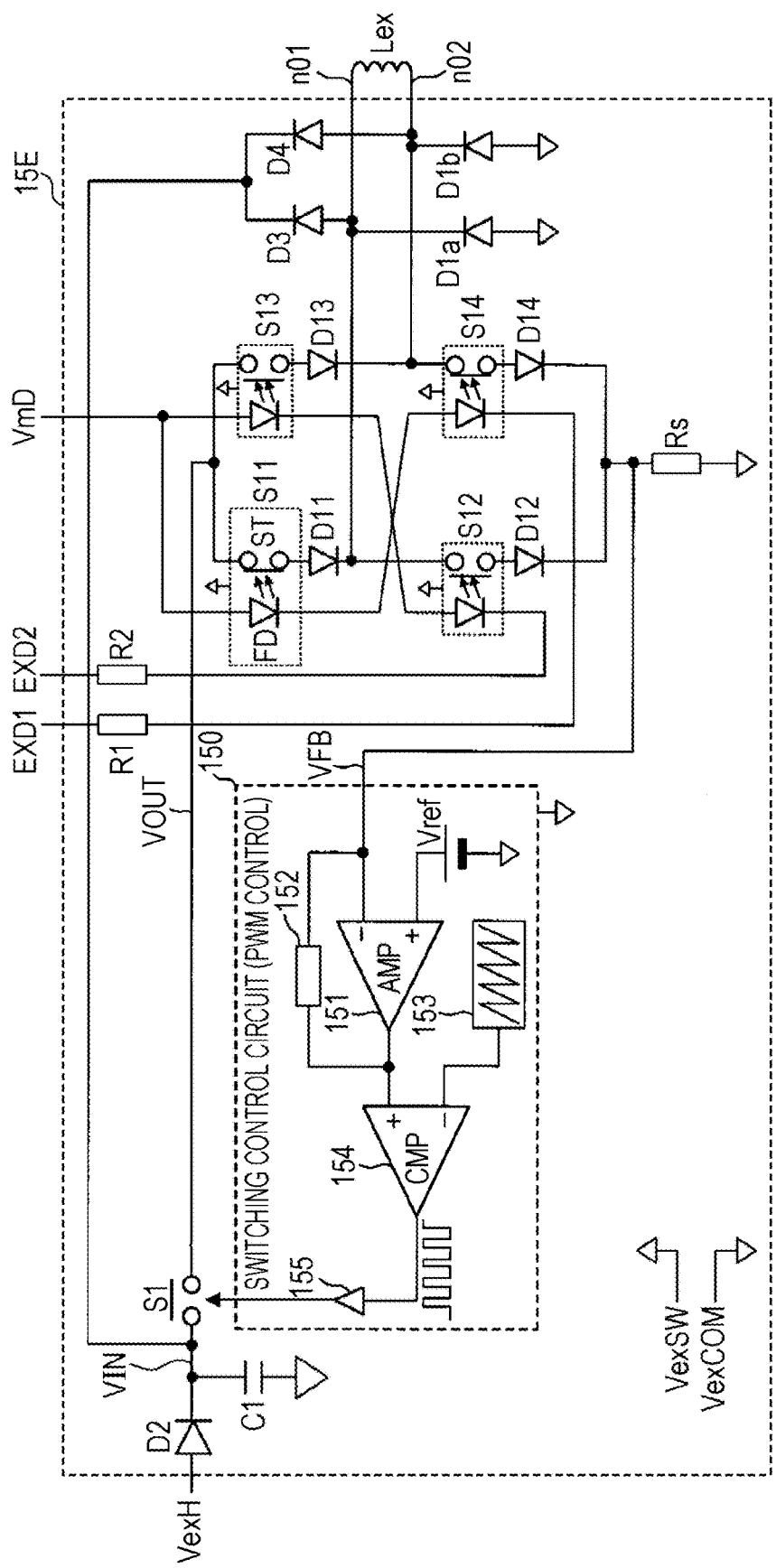
FIG. 14 illustrates the configuration of an excitation circuit according to a sixth embodiment.

FIG. 14 illustrates the configuration of an excitation circuit according to a sixth embodiment.

Unlike the excitation circuit 15C according to the fourth embodiment, an excitation circuit 15E illustrated in FIG. 14 has a function of generating larger excitation voltage by using the counter electromotive force of an excitation coil, and other features are similar to those of the excitation circuit 15C according to the fourth embodiment.

The excitation circuit 15E has a function of charging the counter electromotive force of the excitation coil Lex, which is generated immediately after the switching of the excitation polarity, in a capacitor to collect the counter electromotive force and using the voltage charged in the capacitor for the power supply voltage (excitation voltage) the next time the excitation current rises.

More specifically, the excitation circuit 15E further includes diodes D2, D3, and D4 and a capacitor C1 in addition to the configuration of the excitation circuit 15C according to the fourth embodiment.

The diode D2 is a backflow prevention element for preventing the backflow of current to the signal line VexH. The diode D2 has an anode connected to the signal line VexH and a cathode connected to a first end (signal line VIN) of the high-speed switch S1.

The capacitor C1 has a first end connected to the signal line VIN and a second end connected to the signal line VexCOM.

The diodes D3 and D4 are bridge diodes (plus (+) voltage side) for collecting the counter electromotive force. The diodes D1a and D1b have both a function of a bridge diode (minus (−) voltage side) for collecting the counter electromotive force and a function as a current-returning element for, as in the excitation circuit 15C according to the fourth embodiment, allowing the excitation current Iex to return when the high-speed switch S1 is in the off state.

The diode D3 has an anode connected to the first end (node n01) of the excitation coil Lex and a cathode connected to the signal line VIN.

The diode D4 has an anode connected to the second end (node n02) of the excitation coil Lex and a cathode connected to the signal line VIN.

Figure 15:
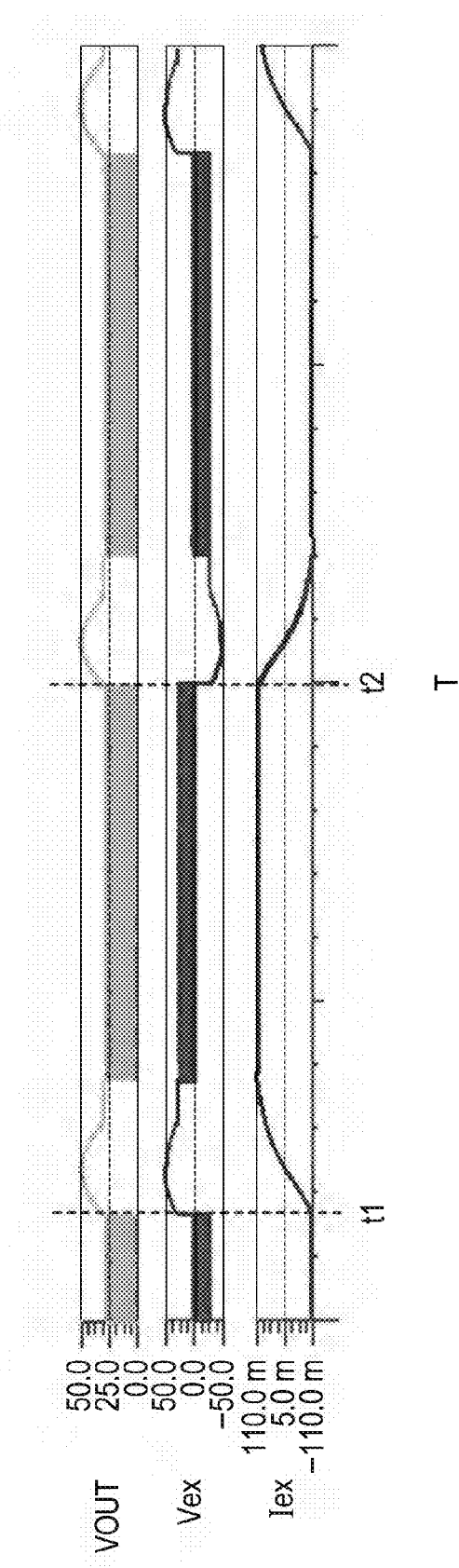
FIG. 15 is a timing chart illustrating voltages and currents at individual nodes during the operation of the excitation circuit according to the sixth embodiment.

FIG. 15 is a timing chart illustrating voltages and currents at the individual nodes in the excitation circuit 15E according to the sixth embodiment. The simulation conditions under which the simulation results illustrated in FIG. 15 are obtained are similar to those in FIG. 5 described above.

As illustrated in FIG. 15, at time t1, when the excitation polarity of the excitation coil Lex is switched from negative to positive (when the switches S11 and S14 are turned on and the switches S12 and S13 are turned off), a counter electromotive voltage is generated across the excitation coil Lex in a direction in which the excitation current Iex having a negative polarity is maintained. Due to the counter electromotive voltage, electric charge is charged in the capacitor C1 from the diode D3 and a voltage VIN exceeding the excitation DC voltage VexH is applied to the signal line VIN. In this case, the diode D2 prevents the backflow of current toward the signal line VexH.

Thus, when the excitation current Iex rises, an excitation voltage Vex larger than the excitation DC voltage VexH can be applied to the excitation coil Lex, which enables a further reduction in the rise time of the excitation current Iex.

After the excitation current Iex rises, control similar to that in the excitation circuit 15C according to the fourth embodiment is performed. That is, when the high-speed switch S1 is in the on state, the excitation DC voltage VexH is applied to the excitation coil Lex via the high-speed switch S1 and the excitation current Iex flows in a path similar to that in FIG. 11A. When the high-speed switch S1 is in the off state, in contrast, the excitation current Iex flows in a path similar to that in FIG. 11B via the diode D1a.

Thereafter, at time t2 in FIG. 15, the excitation polarity of the excitation coil Lex is switched from positive to negative (the switches S11 and S14 are turned off and the switches S12 and S13 are turned on). Then, a counter electromotive voltage is generated across the excitation coil Lex in a direction in which the excitation current Iex having a positive polarity is maintained. Due to the counter electromotive voltage, electric charge is charged in the capacitor C1 from the diode D4 and a voltage VIN exceeding the excitation DC voltage VexH is applied to the signal line VIN.

Thus, when the excitation current Iex falls, an excitation voltage Vex larger than the excitation DC voltage VexH can also be applied to the excitation coil Lex, which enables a further reduction in the fall time of the excitation current Iex.

After the excitation current Iex falls, control similar to that in the excitation circuit 15C according to the fourth embodiment is performed. That is, when the high-speed switch S1 is in the on state, the excitation DC voltage VexH is applied to the excitation coil Lex via the high-speed switch S1 and the excitation current Iex flows in a path similar to that in FIG. 11C. When the high-speed switch S1 is in the off state, in contrast, the excitation current Iex flows in a path similar to that in FIG. 11D via the diode D1b.

Advantages of Excitation Circuit According to the Sixth Embodiment

The excitation circuit 15E according to the sixth embodiment allows the excitation coil Lex to be excited by voltage larger than the excitation DC voltage VexH, which can reduce the time taken until the excitation current Iex becomes stable (stabilization period). It is therefore possible to further increase the excitation frequency and to further improve the measurement stability of the electromagnetic flow meter.

Extended Embodiments

While the inventions made by the inventors has been specifically described with reference to some embodiments thereof, the present disclosure is not limited to these embodiments. It is to be understood that a variety of modifications can be made without departing from the gist of the present disclosure.

Figure 16:
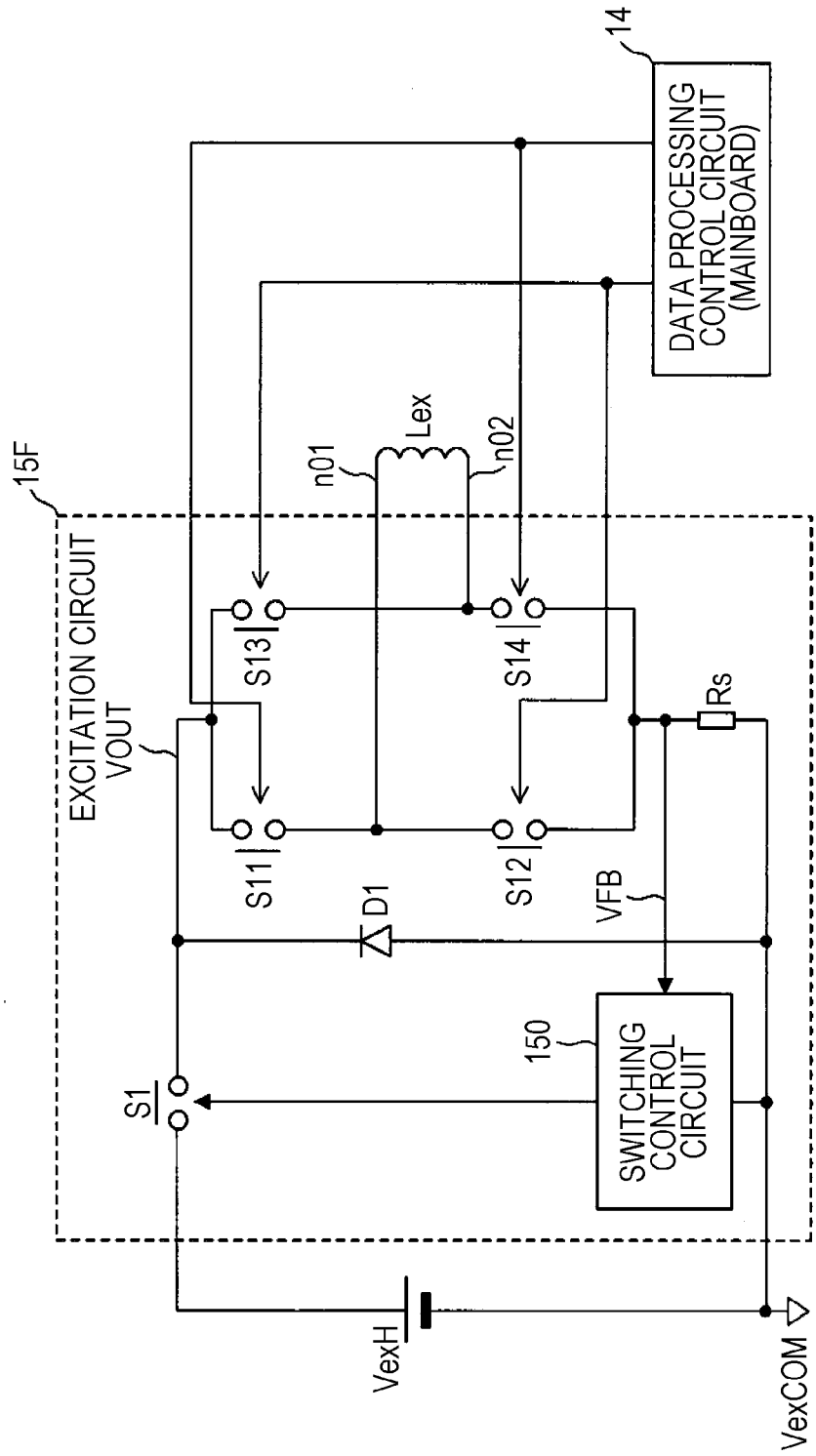
FIG. 16 conceptually illustrates the configuration of an excitation circuit according to another embodiment of the present disclosure.

For example, the embodiments described above provide a circuit configuration in which the diodes D11 to D14, which serve as backflow prevention elements, are connected in series with the low-speed switches S11 to S14, respectively, by way of example but not limitation. For example, if the influence of backflow of current when the high-speed switch S1 is turned off is negligible in terms of measurement stability required for the electromagnetic flow meter, as in an excitation circuit 15F illustrated in FIG. 16, the diodes D11 to D14, which serve backflow prevention elements, may not necessarily be included.

In the fourth and sixth embodiments, the diodes D1a and D1b, instead of the diode D1, are used as current-returning elements, by way of example but not limitation. In addition to the diodes D1a and D1b, the diode D1 may be connected between the signal line VOUT and the signal line VexCOM.

In the fifth embodiment, P-channel MOS transistors (MP1 and MP2) are used as transistors constituting the high-side switch circuits S11 and S13, by way of example but not limitation. Alternatively, N-channel MOS transistors may be used. In this case, a bootstrap circuit or the like for driving the N-channel MOS transistors is necessary.

In the third and sixth embodiments, the switching control circuit 150 that adopts the PWM technique is used, by way of example. Alternatively, the switching control circuit 150A provided in the second embodiment, which adopts the PFM technique, may be used.

In the embodiments described above, furthermore, diodes (such as the diodes D1*a* and D1*b*) are used as rectifier elements, by way of example. Alternatively, similarly to the diode D1, transistors or the like may be used instead, whose on and off states may be controlled as appropriate to implement a rectification function.

In the foregoing description, the excitation circuits according to the embodiments are each applied to a capacitive-type electromagnetic flow meter, by way of example. Each of the excitation circuits according to the embodiments may also be applied to a contact electromagnetic flow meter.

What is claimed is:

1. An excitation circuit for supplying an excitation current to an excitation coil in an electromagnetic flow meter, the excitation circuit comprising:
    a first signal line supplied with a first direct-current voltage;
    a second signal line supplied with a second direct-current voltage lower than the first direct-current voltage;
    a third signal line;
    a fourth signal line;
    a first switch connected between the first signal line and the third signal line;
    a second switch connected between the third signal line and a first end of the excitation coil, the second switch being switched in accordance with intervals at which an excitation polarity of the excitation coil is switched;
    a third switch connected between the first end of the excitation coil and the fourth signal line, the third switch being switched in accordance with the intervals at which the excitation polarity of the excitation coil is switched;
    a fourth switch connected between the third signal line and a second end of the excitation coil, the fourth switch being switched in accordance with the intervals at which the excitation polarity of the excitation coil is switched;
    a fifth switch connected between the second end of the excitation coil and the fourth signal line, the fifth switch being switched in accordance with the intervals at which the excitation polarity of the excitation coil is switched;
    a current-detecting resistor connected between the fourth signal line and the second signal line;
    a switching control circuit that switches between on and off states of the first switch at intervals shorter than the intervals at which the excitation polarity of the excitation coil is switched, such that current flowing through the current-detecting resistor is constant; and
    a current-returning element that allows current in the excitation coil to return via the current-detecting resistor when the first switch is turned off.

2. The excitation circuit according to claim 1, further comprising:
    a first backflow prevention element connected in series with the second switch between the third signal line and the first end of the excitation coil, the first backflow prevention element being configured to allow current flow from the third signal line to the first end of the excitation coil and configured to block current flow in a direction opposite to the current flow from the third signal line to the first end of the excitation coil;
    a second backflow prevention element connected in series with the third switch between the first end of the excitation coil and the fourth signal line, the second backflow prevention element being configured to allow current flow from the first end of the excitation coil to the fourth signal line and configured to block current flow in a direction opposite to the current flow from the first end of the excitation coil to the fourth signal line;
    a third backflow prevention element connected in series with the fourth switch between the third signal line and the second end of the excitation coil, the third backflow prevention element being configured to allow current flow from the third signal line to the second end of the excitation coil and configured to block current flow in a direction opposite to the current flow from the third signal line to the second end of the excitation coil; and
    a fourth backflow prevention element connected in series with the fifth switch between the second end of the excitation coil and the fourth signal line, the fourth backflow prevention element being configured to allow current flow from the second end of the excitation coil to the fourth signal line and configured to block current flow in a direction opposite to the current flow from the second end of the excitation coil to the fourth signal line.

3. The excitation circuit according to claim 2, wherein
    the first backflow prevention element includes a first metal-oxide-semiconductor transistor having a source connected to the first end of the excitation coil and a drain connected to the third signal line via the second switch,
    the second backflow prevention element includes a second metal-oxide-semiconductor transistor having a source connected to the second signal line via the third switch and a drain connected to the first end of the excitation coil,
    the third backflow prevention element includes a third metal-oxide-semiconductor transistor having a source connected to the second end of the excitation coil and a drain connected to the third signal line via the fourth switch, and
    the fourth backflow prevention element includes a fourth metal-oxide-semiconductor transistor having a source connected to the second signal line via the fifth switch and a drain connected to the second end of the excitation coil.

4. The excitation circuit according to claim 1, wherein
    the current-returning element includes a rectifier element connected between the second signal line and the third signal line, the rectifier element being configured to allow current flow from the second signal line to the third signal line and configured to block current flow in a direction opposite to the current flow from the second signal line to the third signal line.

5. The excitation circuit according to claim 1, wherein
    the current-returning element is a synchronous rectifier switch connected between the second signal line and the third signal line, and
    the switching control circuit turns off the synchronous rectifier switch when the first switch is turned on, and turns on the synchronous rectifier switch when the first switch is turned off.

6. The excitation circuit according to claim 1, wherein the current-returning element includes
    a first rectifier element connected between the first end of the excitation coil and the second signal line, the first rectifier element being configured to allow current flow from the second signal line to the first end of the excitation coil and configured to block current flow in a direction opposite to the current flow from the second signal line to the first end of the excitation coil, and a second rectifier element connected between the second end of the excitation coil and the second signal line, the second rectifier element being configured to allow current flow from the second signal line to the second end of the excitation coil and configured to block current flow in a direction opposite to the current flow from the second signal line to the second end of the excitation coil.

7. The excitation circuit according to claim 6, further comprising:

a third rectifier element connected between the first signal line and the first switch, the third rectifier element being configured to allow current flow from the first signal line to the first switch and configured to block current flow in a direction opposite to the current flow from the first signal line to the first switch;

a fifth signal line to which the third rectifier element and the first switch are connected;

a capacitor connected between the fifth signal line and the second signal line;

a fourth rectifier element connected between the fifth signal line and the first end of the excitation coil, the fourth rectifier element being configured to allow current flow from the first end of the excitation coil to the fifth signal line and configured to block current flow in a direction opposite to the current flow from the first end of the excitation coil to the fifth signal line; and a fifth rectifier element connected between the fifth signal line and the second end of the excitation coil, the fifth rectifier element being configured to allow current flow from the second end of the excitation coil to the fifth signal line and configured to block current flow in a direction opposite to the current flow from the second end of the excitation coil to the fifth signal line.

8. The excitation circuit according to claim 1, wherein the switching control circuit outputs a pulse-width-modulation signal having a pulse width that is variable in accordance with a difference between a current flowing through the current-detecting resistor and a target current value, and performs switching of the first switch.

9. The excitation circuit according to claim 1, wherein the switching control circuit outputs a pulse-frequency-modulation signal having a frequency that is variable in accordance with a difference between a current flowing through the current-detecting resistor and a target current value, and performs switching of the first switch.

10. The excitation circuit according to claim 1, wherein the switching control circuit comprises a single semiconductor integrated circuit.

11. An electromagnetic flow meter comprising:

a measuring pipe in which a fluid to be measured flows;

the excitation circuit according to claim 1;

the excitation coil, the excitation coil being external to the measuring pipe;

a pair of electrodes attached to the measuring pipe, the pair of electrodes facing each other in a direction perpendicular to a magnetic field generated from the excitation coil; and a data processing control circuit that calculates a flow rate of the fluid based on an electromotive force generated between the pair of electrodes.

12. The electromagnetic flow meter according to claim 11, wherein the pair of electrodes are disposed in non-contact with the fluid in the measuring pipe.

* * * * *